(12) United States Patent
Kozak

(10) Patent No.: US 7,766,583 B2
(45) Date of Patent: Aug. 3, 2010

(54) WORKPIECE REMOVAL DEVICE FOR A HOLE SAW AND PLUG CUTTER

(75) Inventor: Burton Kozak, Chicago, IL (US)

(73) Assignee: Eazypower Corporation, Chicago, IL (US)

( * ) Notice: Subject to any disclaimer, the term of this patent is extended or adjusted under 35 U.S.C. 154(b) by 922 days.

(21) Appl. No.: 11/356,729

(22) Filed: Feb. 17, 2006

(65) Prior Publication Data

US 2006/0210366 A1    Sep. 21, 2006

Related U.S. Application Data

(63) Continuation-in-part of application No. 10/402,687, filed on Mar. 29, 2003, now Pat. No. 7,001,116.

(51) Int. Cl.
*B23B 51/04* (2006.01)
(52) U.S. Cl. .......................... 408/1 R; 408/68; 408/204
(58) Field of Classification Search ................. 408/68, 408/204–209, 238, 239 R, 703, 1 R; *B23B 51/04, B23B 51/05*
See application file for complete search history.

(56) References Cited

U.S. PATENT DOCUMENTS

| | | | | | |
|---|---|---|---|---|---|
| 1,234,467 | A | * | 7/1917 | Hamilton | 408/68 |
| 1,356,019 | A | * | 10/1920 | See | 408/65 |
| 1,365,660 | A | | 1/1921 | Collier | 408/86 |
| 1,645,736 | A | | 10/1927 | Blanch et al. | 408/206 |
| 2,721,592 | A | | 10/1955 | Baker | 408/206 |
| 2,852,967 | A | | 9/1958 | Mueller et al. | 408/206 |
| 3,265,104 | A | | 8/1966 | Gallo, Sr. | 408/68 |
| 3,360,025 | A | * | 12/1967 | Gallo, Sr. | 408/239 R |
| 3,390,596 | A | | 7/1968 | Trevathan | 408/68 |
| 3,647,310 | A | | 3/1972 | Morse | 408/239 R |
| 3,648,508 | A | | 3/1972 | Hougen | 72/325 |
| 3,758,221 | A | | 9/1973 | Meshulam | 408/204 |
| 4,406,334 | A | * | 9/1983 | Baumann et al. | 175/315 |
| 4,422,811 | A | | 12/1983 | Ellison et al. | 408/204 |
| 4,741,651 | A | * | 5/1988 | Despres | 408/209 |
| 4,749,315 | A | * | 6/1988 | Mills | 408/209 |
| 5,035,548 | A | | 7/1991 | Pidgeon | 408/68 |
| 5,082,403 | A | * | 1/1992 | Sutton et al. | 408/68 |
| 5,435,672 | A | * | 7/1995 | Hall et al. | 408/68 |
| 5,690,452 | A | * | 11/1997 | Baublits | 408/204 |
| 5,810,524 | A | | 9/1998 | Wirth, Jr. et al. | 408/203.5 |
| 5,934,845 | A | | 8/1999 | Frey | 408/68 |

(Continued)

FOREIGN PATENT DOCUMENTS

AU    234301    6/1961    ................. 408/204

(Continued)

*Primary Examiner*—Daniel W Howell
(74) *Attorney, Agent, or Firm*—Factor & Lake, Ltd.

(57) ABSTRACT

One embodiment relates to a workpiece removal device for a plug cutter. This combination comprises a housing having a longitudinally extending surface, a first closed end and a second open end opposite the first closed end. A boss is coupled (removably coupled for example) to the first closed end and extends toward the second open end, and a biasing member (a spring for example) is attached to a distal end of the boss. The combination further comprises means for contacting a predetermined portion of the biasing member with a workpiece, whereby a preselected portion of the workpiece is ultimately severed from the workpiece. The biasing member ejects the preselected portion from the plug cutter, forming a plug.

21 Claims, 24 Drawing Sheets

U.S. PATENT DOCUMENTS 6,120,221 A * 9/2000 Alm .......................... 408/204
6,273,652 B1 8/2001 Wirth, Jr. et al. ......... 408/203.5
7,001,116 B2 * 2/2006 Kozak ........................ 408/68

FOREIGN PATENT DOCUMENTS

| | | | |
|---|---|---|---|
| FR | 904860 | 11/1945 | ............... 408/204 |
| FR | 2668405 | 4/1992 | |
| GB | 1589293 A * | 5/1981 | |
| JP | 57-163006 | 10/1982 | ............... 408/204 |
| JP | 2003-145330 | 5/2003 | |
| NL | 63762 | 7/1949 | ............... 408/204 |
| SU | 271781 | 9/1970 | ............... 408/204 |

* cited by examiner

WORKPIECE REMOVAL DEVICE FOR A HOLE SAW AND PLUG CUTTER

CROSS REFERENCE TO RELATED APPLICATIONS

This application is a continuation-in-part of, and claims priority from, U.S. patent application Ser. No. 10/402,687 filed Mar. 29, 2003, now U.S. Pat. No. 7,001,116 issued Feb. 21, 2006, the complete subject matter of which is incorporated herein by reference in its entirety.

CONTRACTUAL ORIGIN OF THE INVENTION

Not Applicable.

BACKGROUND OF THE INVENTION

1. Field of the Invention

The present invention relates to hole saws and plug cutters. More specifically, the present invention relates to a workpiece removal device for plug cutters.

2. Background of the Invention

Hole saws are commonly used to cut out annular portions from a workpiece. The workpiece may include wood, drywall, plaster and cylinder blocks. The annular cut out portion may be utilized for piping, electrical conduit or access portals to wiring and control equipment. The hole saw includes a drill bit that penetrates a workpiece to stabilize the hole saw assembly, including a rotary drive tool, as a cutting portion of the hole saw engages the workpiece.

It is contemplated that the operator may make a mistake and wish to fill the hole created by the hole saw for example. Further, finish work may require covering or capping a hole containing a screw, bolt, nut or the like for aesthetic reasons. Plug cutters are used to cut plugs from a workpiece to fill such holes.

The problem with prior plug cutters is that the severed portion inside the bore of the plug cutter can be difficult to remove. In some instances, the user needs to forcibly pry the severed portion from the plug cutter with a screwdriver or similar rigid tool. Often, manual removal of the plug results in damage to or destruction of the plug. Whatever the technique utilized to remove the severed portion, an excessive loss of time and money result from the user having to wrestle with the manual removal of the severed portion from the plug cutter cavity.

A need exists for a device that can "eject" the severed portion from the plug cutter without requiring manual assistance. To facilitate workflow, the ejection should occur substantially simultaneously with the plug cutter disengaging from the workpiece.

SUMMARY OF THE INVENTION

It is an object of the present invention to overcome many of the disadvantages associated with plug cutters.

A principle object of the present invention is to provide a workpiece removal device for a plug cutter. A feature of the device is that it acts as a spring biased piston residing in and detachably secured to the plug cutter. An advantage of the device is that devices of varying compression stroke distances may be utilized with a single housing so as to enable a single device to produce a myriad of plugs having varying thicknesses.

Another object of the present invention is to provide a workpiece removal device that removes a severed portion of the workpiece from a cavity or bore in the plug cutter. A feature of the device is a biasing spring that has a secured first end and a "free" second end that promotes axial movement of the spring relative to the device. An advantage of the device is that the spring forcibly removes or ejects the severed workpiece portion from the plug cutter without manual assistance as soon as the plug-cutter disengages the surface of the workpiece.

Yet another object of the present invention is to direct a spring biasing force perpendicular to a preselected portion of a workpiece. A feature of the device is the integral joining of the first and second securing members with corresponding ends of the biasing spring, the securing members each having an aperture through a central portion thereby forming a "spool" configuration when opposing ends of the biasing spring are joined to the securing members. An advantage of the device is that the relative position of the spring can be maintained while the spring is compressed during the cutting of the predetermined portion of the workpiece, thereby proving a stop to prevent further penetration of the plug cutter into the workpiece. This allows different devices to be utilized to produce plugs of different lengths and/or diameters.

Still another object of the present invention is to provide a plug cutter having inherent stabilization. A feature of the device is a spring biased piston co-axially aligned with the circular periphery formed by the cutting edge or teeth of a hole saw housing such that a distal surface of the piston, and the periphery, are substantially co-planar. An advantage of the invention is that the piston and cutting portion of the plug cutter engage a workpiece substantially simultaneously.

One embodiment relates to a workpiece removal device for a plug cutter. This combination comprises a generally cylindrical housing having a longitudinally extending surface, a first closed end and a second open end opposite the first closed end. A boss is coupled (removably coupled for example) to the first closed end and extends toward the second open end, and a biasing member (a spring for example) is attached to a distal end of the boss. The combination further comprises means for contacting a predetermined portion of the biasing member with a workpiece, whereby a preselected portion is ultimately severed from the workpiece. The biasing member ejects the preselected portion from the plug cutter, forming a plug.

Yet another embodiment relates to a workpiece removal device for a plug cutter. In this embodiment, the combination comprises a housing, a boss, a biasing member coupled to the boss, one securing member attached to the biasing member and a contacting means. The housing has a longitudinally extending surface, a first closed end and a second open end opposite the first closed end. The boss is removably coupled to the first closed end and extends toward the second open end. In at least one embodiment, the boss comprises a locking member configured to be removably received in a rotary motion tool. The contacting means contacts a predetermined portion of the one securing member with a workpiece, whereby a preselected portion is ultimately severed from the workpiece, whereupon the biasing member ejects the preselected portion from the plug cutter, forming a plug.

Embodiments are contemplated, wherein the boss comprises a locking member located proximate the distal end of the boss, the locking member having a threaded end portion and a shank portion with opposing first and second ends, the threaded end portion end integrally joined to the first end of the shank portion and the second end of the shank portion configured for insertion through an aperture defined in the first closed end and removably received in a rotary motion tool. A locking nut is configured to slide over the shank portion and threadably engage the threaded end portion, whereby the position of the boss removably couples the boss to the plug cutter. The locking nut threadably engages the threaded end portion of the locking member such that an inner end of the locking nut forcibly engages an outer planar wall of the first closed end, thereby rigidly removably coupling the boss fastening member to the first closed end.

In at least one embodiment, the biasing member (a spring for example) comprises first and second securing members, the first securing member coupled to both a first end of the spring and the distal end of the boss, and the second securing member coupled to at least a second end of the spring. One or both of the securing members may comprise a flat disk and/or a washer.

In yet other embodiments, the contacting means comprises a distal end of the biasing member coaxially aligned with a circular periphery of the second open end of the plug cutter, such that the distal end of the biasing member and the circular periphery are coplanar. The contacting means may comprise the biasing member configured to engage the preselected portion of the workpiece prior to a cutting portion proximate the second closed end of the plug cutter engaging the preselected portion of the workpiece. Further, the contacting means may comprise at least a portion of the biasing means compressing when a portion of the second closed end of the plug cutter engages the workpiece.

In yet other embodiments, the contacting means comprises the biasing member generating sufficient expansion force to eject the plug from the plug cutter when the plug cutter disengages the workpiece. The contacting means may also comprises the biasing means generating such sufficient expansion force when the plug cutter disengages the workpiece, ejecting the plug from the plug cutter simultaneously with the disengagement. Yet still one other embodiment of the present invention provides a method of forming a plug using a plug cutter. The method comprises engaging a preselected portion of a workpiece using at least a portion of one securing member proximate an open end of the plug cutter. The preselected portion of the workpiece is engaged using a cutting portion proximate an the second open end of the plug cutter and a biasing member having one end joined to the one securing member and another end joined to a boss coupled to a closed end of the plug cutter is compressed. The preselected portion of the workpiece is severed and the workpiece is disengaged. The severed, preselected portion of the workpiece is removed or ejected from the bore of the plug cutter using the biasing member substantially simultaneously with the cutting portion disengaging from the workpiece; forming the plug.

DESCRIPTION OF THE DRAWING

These and other objects, advantages and novel features of the present invention, as well as details of an illustrative embodiment thereof, will be more fully understood from the following detailed description and attached drawings, wherein.

DETAILED DESCRIPTION OF THE INVENTION

Figure 1:
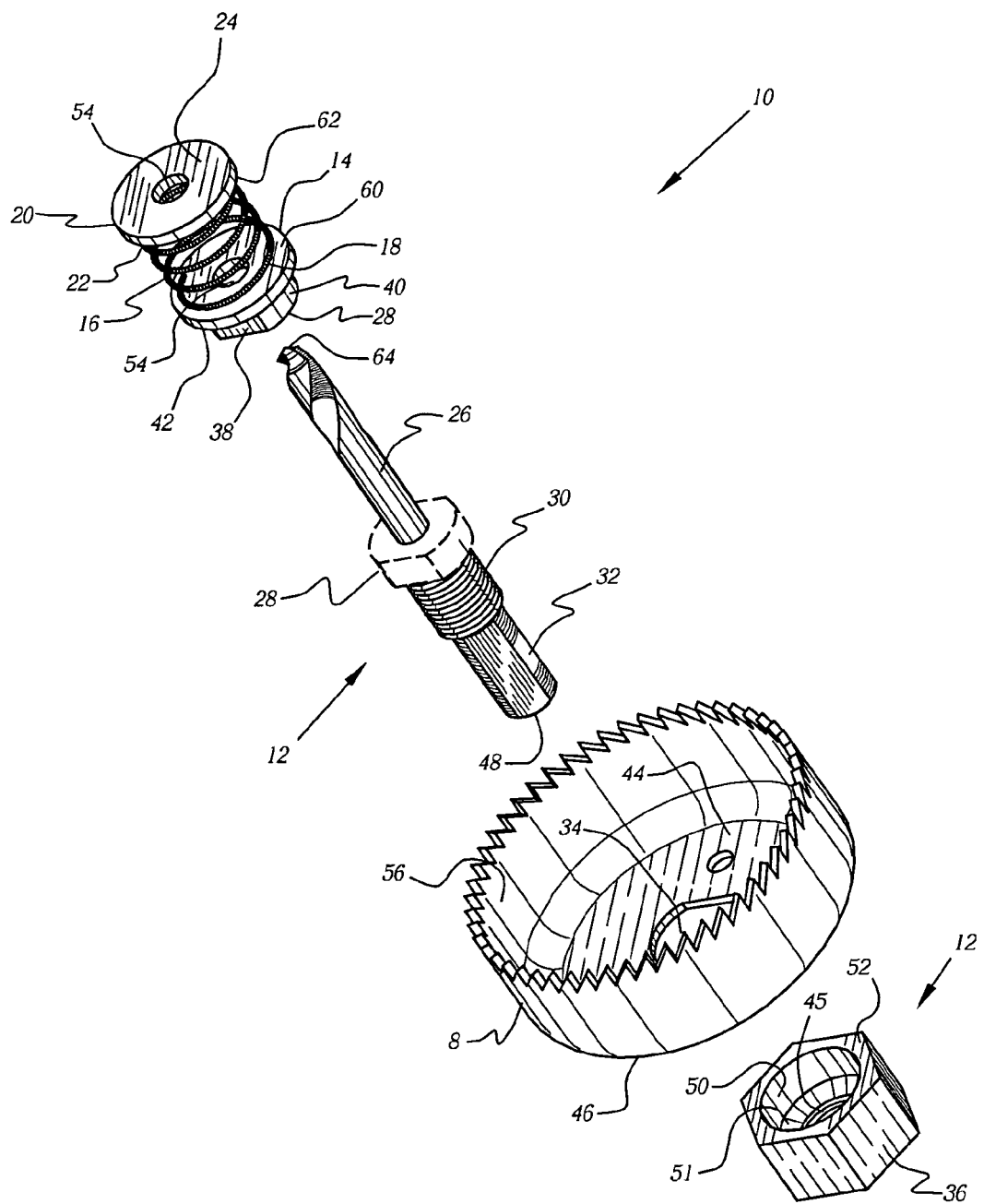
FIG. 1 is a exploded perspective view of a workpiece removal device for a hole saw in accordance with the present invention.

One embodiment relates to a stable workpiece or plug expulsion device used with a cutting portion of a plug cutter. A feature of the device is a threaded portion of the fastening member that removably receives a locking nut, which ultimately secures the fastening member to the plug cutter. Another feature of the device is a second securing member disposed upon the fastening member such that the second securing member and a cutting portion of the plug cutter engage a workpiece substantially simultaneously, although other arrangements are contemplated (at least a portion of the second securing member engages the workpiece prior or subsequent to a cutting portion of the plug cutter for example). An advantage of the device is that the axial positions of the plug cutter and biasing spring relative to the workpiece are substantially maintained during the cutting operation, thereby providing an aperture with axis perpendicular to the surface of the workpiece.

One embodiment relates to a stable workpiece or plug expulsion device used with a cutting portion of a plug cutter and having a replaceable biasing spring. A feature of the device is first and second securing members that are joined to the biasing spring. An advantage of the device is that the biasing spring need only be replaced, rather than the entire plug cutter assembly, when work pieces of varying fabrication materials are cut. Another advantage of the device is that the biasing spring is easily replaced after becoming fatigued due to excessive use.

One embodiment relates to a stable workpiece or plug expulsion device used with a cutting portion of a plug cutter that prevents friction between a second securing member and a workpiece. A feature of the device is multiple ball bearings that are disposed between inner and outer raceways of the second securing member. An advantage of the device is that the outer raceway remains stationary upon engaging the surface of the workpiece thereby avoiding excessive heat generation that could damage the device when the plug cutter penetrates a workpiece.

One embodiment relates to a stable workpiece or plug expulsion device used with a cutting portion of a plug cutter that maintains a cut portion of a workpiece within a cavity or bore of the plug cutter. A feature of the device is a plug cutter having an axial dimension relatively longer than the axial dimension of the combined biasing spring and securing members. An advantage of the device is that a severed portion of the workpiece remains at least partially in the plug cutter after removing the plug cutter from the workpiece thereby preventing the severed portion from falling out of the plug cutter.

One embodiment relates to a stable workpiece or plug expulsion device used with a cutting portion of a plug cutter comprising a fastening member, first and second securing members, a biasing member and a means for disposing a predetermined portion of the second securing member in communication with a workpiece. The fastening member is joined to the plug cutter and the first securing member is integrally joined to the fastening member. The biasing member has a first end integrally joined to the first securing member, while the second securing member is integrally joined to a second end of the biasing member. The disposing means disposes a predetermined portion of the second securing member in communication with the workpiece irrespective of the orientation of the plug cutter, whereby a preselected portion of the workpiece is ultimately severed. The biasing member forcibly removes the preselected portion from the plug cutter, forming a plug.

One embodiment relates to a stable workpiece or plug expulsion device used with a cutting portion of a plug cutter that comprises a fastening member, a biasing member, and means for engaging a second securing member with a workpiece. The fastening member is removably joined to the plug cutter while the biasing member has a first end joined to a first securing member and a second end joined to a second securing member. The engaging means engages the second securing member with a workpiece whereby a preselected portion of the workpiece is severed from the workpiece by the plug cutter. The biasing means forcibly removes the severed preselected portion of the workpiece from the plug cutter, forming a plug.

One embodiment relates to a stable workpiece or plug expulsion device used with a cutting portion of a plug cutter that comprises a tapered plug cutter, a first securing member, a biasing member, a second securing member and means for engaging the second securing member with the workpiece. The first securing member is disposed adjacent to a bottom wall of the tapered plug cutter and the biasing member has a first end secured to the first securing member. The second securing member is secured to a second end of the biasing member. The engaging means engages the second securing member with the workpiece whereby a preselected portion of the workpiece is ultimately severed and removed from the workpiece by the tapered plug cutter. The biasing means forcibly removes a portion of the severed preselected portion of the workpiece from the plug cutter, forming a plug.

Figure 2:
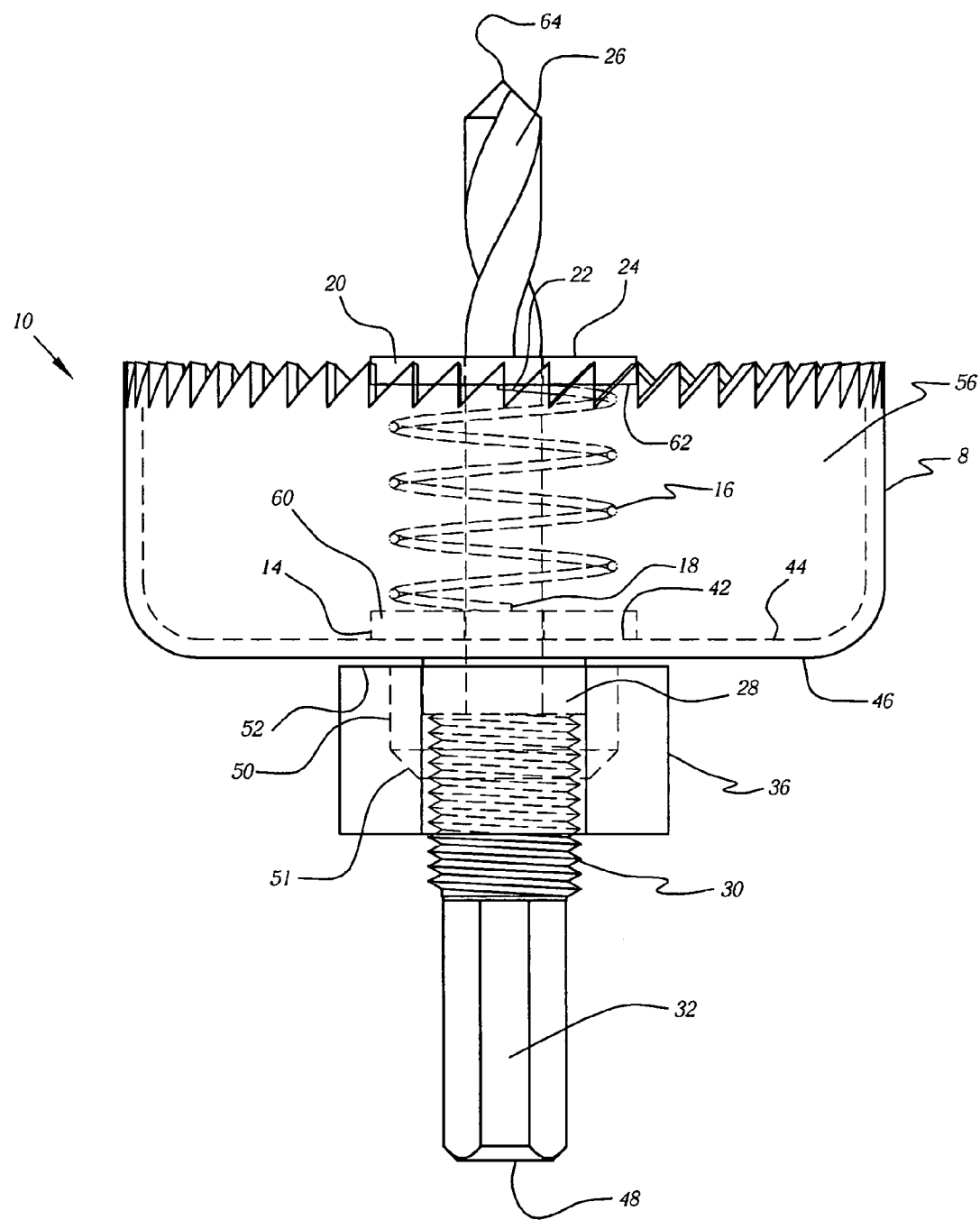
FIG. 2 is a side elevation view of the device secured to a hole saw, the device includes a biasing spring in a non-biased position.
Figure 3:
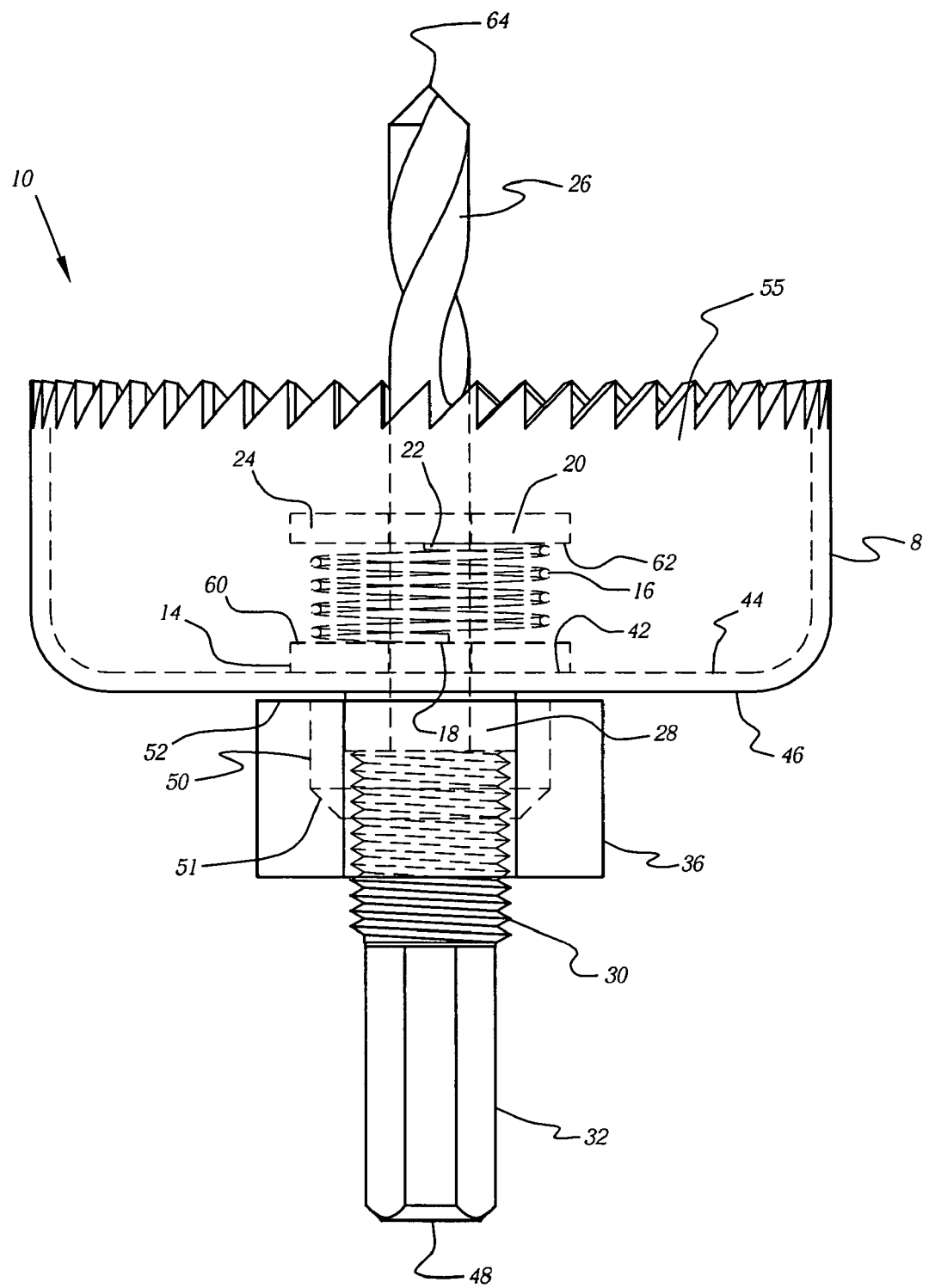
FIG. 3 is a side elevation view of the device and hole saw of FIG. 2 except that the biasing spring is in a biased position.

Referring now to FIGS. 1, 2 and 3, a workpiece removal device for a hole saw 8 (not part of the invention) is denoted by numeral 10. The device 10 is fabricated from metal with carbon steel being the material of choice. The device 10 includes a positioning member 12 that is detachably joined to the hole saw 8, a first securing member 14 integrally joined (via welding or similar methods) to the positioning member 12, a biasing member or spring 16 having a first end 18 integrally joined to the first securing member 14, and a second securing member 20 integrally joined to a second end 22 of the spring 16. An outer wall 24 of the second securing member 20 is ultimately disposed to communicate (irrespective of the orientation of the hole saw 8) with a preselected portion of the workpiece to promote the severance of the preselected portion from the workpiece by the hole saw 8. As the hole saw 8 cuts deeper into the workpiece, the spring 16 is increasingly compressed until the hole saw 8 severs the preselected portion, whereupon, the spring 16 expands to forcibly remove the severed preselected portion of the workpiece from the hole saw 8.

The positioning member 12 includes a drill bit 26 integrally joined to a locking member 28 with a threaded end portion 30. The threaded end portion 30 of the locking member 28 is integrally joined to a shank portion 32. The locking member 28 is configured to snugly insert through an aperture 34 in the hole saw 8 whereby the position of the positioning member 12 is secured relative to the hole saw 8 upon the threaded joining of a locking nut 36 to the threaded end portion 30. The shank portion 32 is removably secured to a rotary motion tool (not depicted) thereby providing rotational force to the drill bit 26. The drill bit 26 has a typical configuration and is dimensioned to penetrate, when rotated, the workpiece sufficiently to guide and stabilize the second securing member 20 and hole saw 8 upon engaging the workpiece thereby promoting the severing of a preselected portion 66 of the workpiece until the hole saw 8 is removed from the workpiece.

The locking member 28 is substantially a standard threaded hex nut with the exception that the external wall configuration has been modified to include two opposing planar walls 38 and two opposing arcuate walls 40 that snugly insert through a corresponding configuration of the aperture 34 in the hole saw 8 thereby promoting the transfer of rotary motion from the positioning member 12 to the hole saw 8 while reducing wear between engaging portions of the locking member 28 and the hole saw 8 when the forceful transfer of rotary motion occurs. The threaded end portion 30 is integrally joined to the locking member 28 via welding or similar methods. The threaded end portion 30 includes typical NPT type outer threads having an outer diameter that facilitates the relatively snug passage of the end portion 30 through the aperture 34 in the hole saw 8. The end portion 30 and the locking member 28 are ultimately inserted through the aperture 34 until an outer planar wall 42 of the first securing member 14 engages an inner planar wall 44 of the hole saw 8.

The shank portion 32 of the positioning member 12 has a typical hexagonal configuration for insertion into a standard chuck portion of a rotary drive tool. The shank portion 32 is dimensioned to cooperate with the longitudinal and diameter dimensions of the threaded end portion 30 to allow the locking nut 36 to snugly slide upon the shank portion 32 until the internal threads 45 of the locking nut 36 engage the outer threads of the end portion 30, whereupon, the locking nut 36 is tightened until forcibly engaging an outer planar wall 46 of the hole saw 8. The tightened locking nut 36 results with the threaded end portion 30 extending longitudinally through the nut 36 to dispose the shank portion 32 for insertion into the chuck portion of the rotary drive tool. The shank portion 32 has a longitudinal dimension that facilitates a slight separation between the threaded end portion 30 and the chuck portion of the rotary drive tool after an end wall 48 of the shank portion 32 engages a corresponding inner wall of the chuck portion.

The locking nut 36 has an internal configuration that includes a cavity 50 that snugly captures the locking member 28 protruding through the hole saw 8 as the threaded end portion 30 engages the internal threads 45 of the nut 36. The cavity 50 includes a conical reducing portion 51 that joins with the internal threads 45 to "funnel" the end portion 30 into threaded engagement with the internal threads 45. The configuration of the locking nut 36 promotes the threaded joining of the locking nut 36 with the end portion 30 such that an inner end wall 52 of the nut 36 forcibly engages the outer planar wall 46 of the hole saw 8 thereby rigidly securing the positioning member 12 to the hole saw 8.

The first and second securing members 14 and 20 include standard washers having central apertures 54 that snugly receive cooperating portions of the positioning member 12 therethrough. The diameters of the securing members 14 and 20 are relatively larger than the diameter of the spring 16 to facilitate a stable joining of the securing members 14 and 20 with the spring 16. The spring 16 is fabricated from metal and has sufficient expansion force, after being compressed, to forcibly remove a severed portion of a workpiece from an internal cavity 56 of a hole saw 8. A suitable spring 16 is manufactured by Prime-Line Products Company in San Bernardino, Calif. The part number of the spring 16 is SP-9709.

In operation, a hole saw 8 is selected to circularly cut a predetermined portion of a workpiece. Based upon the size of the predetermined portion and the fabrication material for the workpiece, a device 10 is selected to guide the hole saw to ultimately engage and cut the workpiece, and to remove the cut portion of the workpiece from the internal cavity 56 of the hole saw 8 after the predetermined portion 66 has been completely severed from the workpiece. The device 10 is assembled and secured to the hole saw 8 by inserting a shank portion 32 of a positioning member 12 of the device 10 through an aperture 34 in a central portion of the hole saw 8 such that an outer wall 42 of a first securing member 14 engages an inner wall 44 of the hole saw 8, whereupon, a locking nut 36 is threaded onto a threaded end portion 30 of a locking member 28. The locking nut 36 is tightened upon the threaded end portion 30 until the inner end wall 52 of the nut 36 forcibly engages an outer wall 46 of the hole saw 8 thereby rigidly securing the device 10 to the hole saw 8.

The outer wall 42 of the first securing member 14 is integrally joined to an outer wall 58 (see FIG. 1B) of the locking member 28; a spring 16 having already been secured to inner walls 60 and 62 of first and second members 14 and 20 thereby securing and axially aligning the spring 16 and securing members 14 and 20 to a drill bit 26 which is integrally joined to a central portion of the securing member 28. The securing members 14 and 20, and the spring 16 are configured to allow the securing members 14 and 20 to snugly slide upon the periphery of the drill bit 26, while the spring 16 is suspended circumferentially about the bit 26 and between the securing members 14 and 20 such that the spring 16 does not engage the bit 26 at any time, irrespective of a compressed or extended disposition as depicted in FIGS. 2 and 3.

Figure 4:
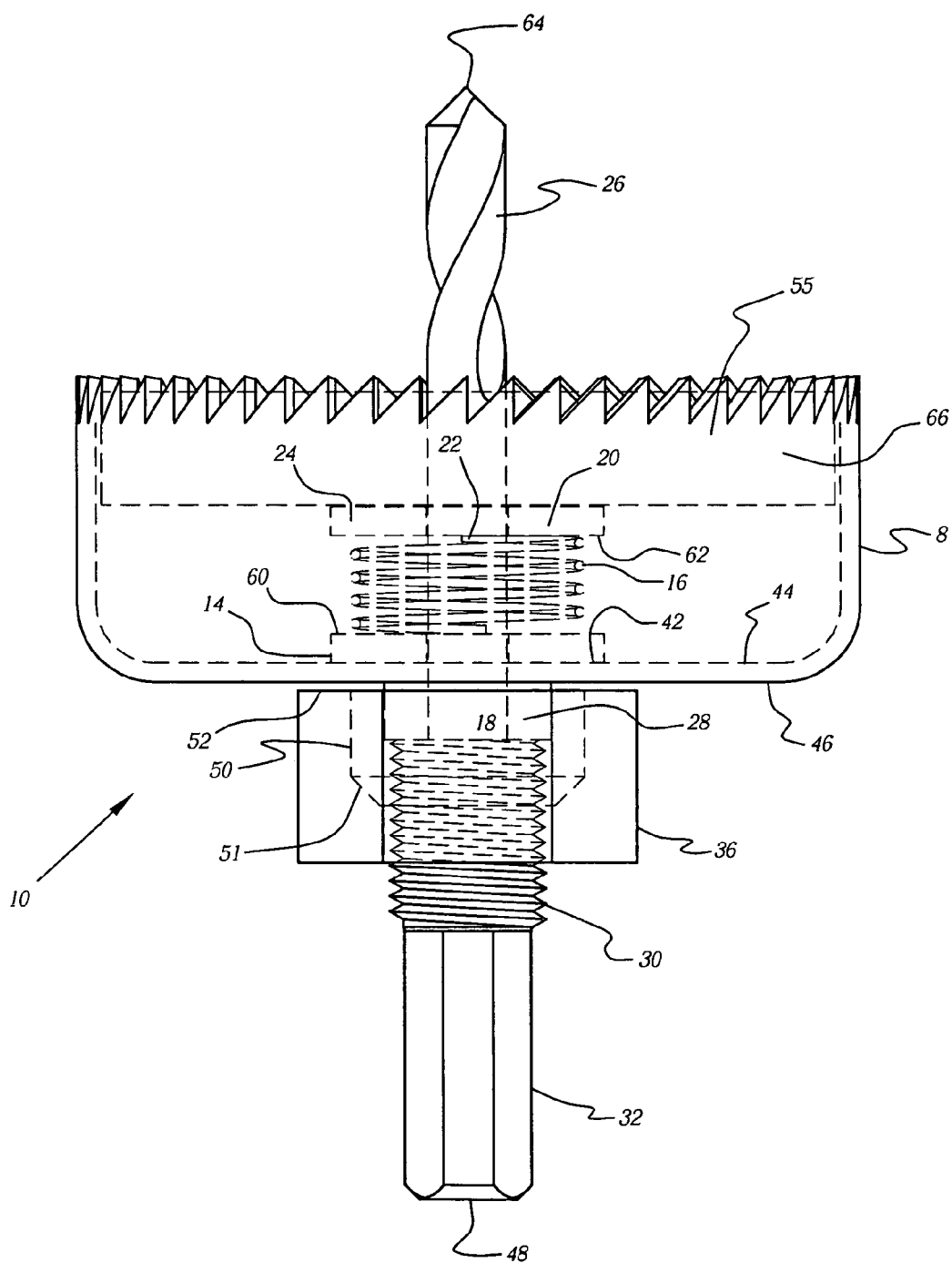
FIG. 4 is a side elevation view of the device and hole saw of FIG. 3 except that a severed portion of a workpiece is inside the hole saw compressing the biasing spring.
Figure 5:
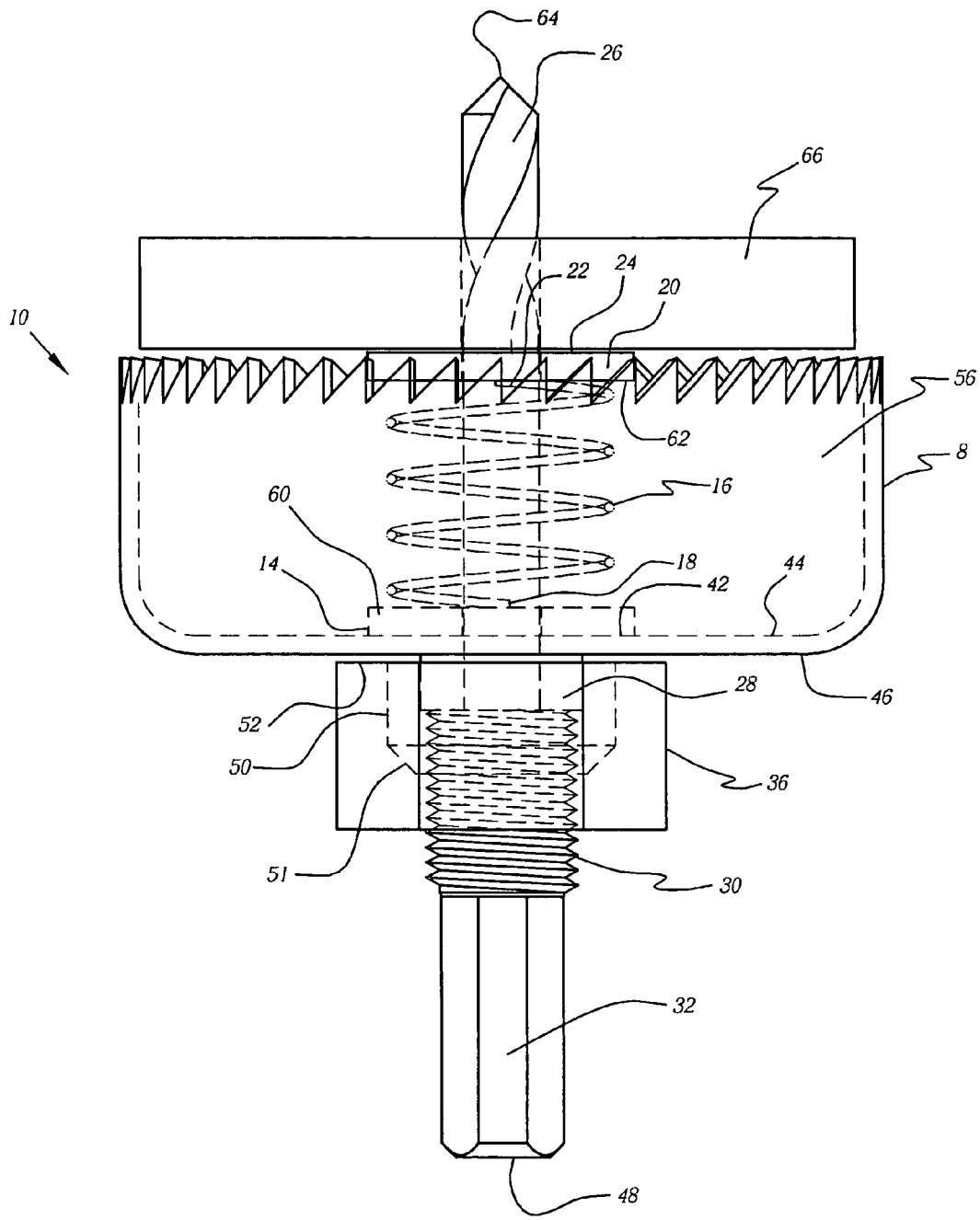
FIG. 5 is a side elevation view of the device and hole saw of FIG. 4 except that the severed portion of the workpiece is depicted removed from the hole saw by the biasing spring expanding to its non-biased position.

After securing the device 10 to the hole saw 8, the shank portion 32 is removably inserted into a rotary power tool. A tip portion 64 of the drill bit 26 is centrally positioned upon the predetermined portion of the workpiece that is to be cut by the hole saw 8. The rotary power tool is then energized to forcibly drive the drill bit 26 into the workpiece until the hole saw 8 engages the predetermined portion of the workpiece to be cut and removed. The drill bit 26 and the hole saw 8 both continue to penetrate until the hole saw 8 completely severs the predetermined portion from the workpiece resulting in the compression of the spring 16 and the disposition of a severed workpiece portion 66 into the internal cavity 56 of the hole saw 8 as depicted in FIG. 4. The hole saw 8 is then manually separated from the workpiece resulting in the spring 16 expanding to forcibly remove the severed workpiece portion 66 from the internal cavity 56 of the hole saw 8 as depicted in FIG. 5, whereupon, the severed portion of the workpiece is manually slid from the drill bit 26 thereby allowing the hole saw to cut another annular opening into the workpiece.

Figure 1A:
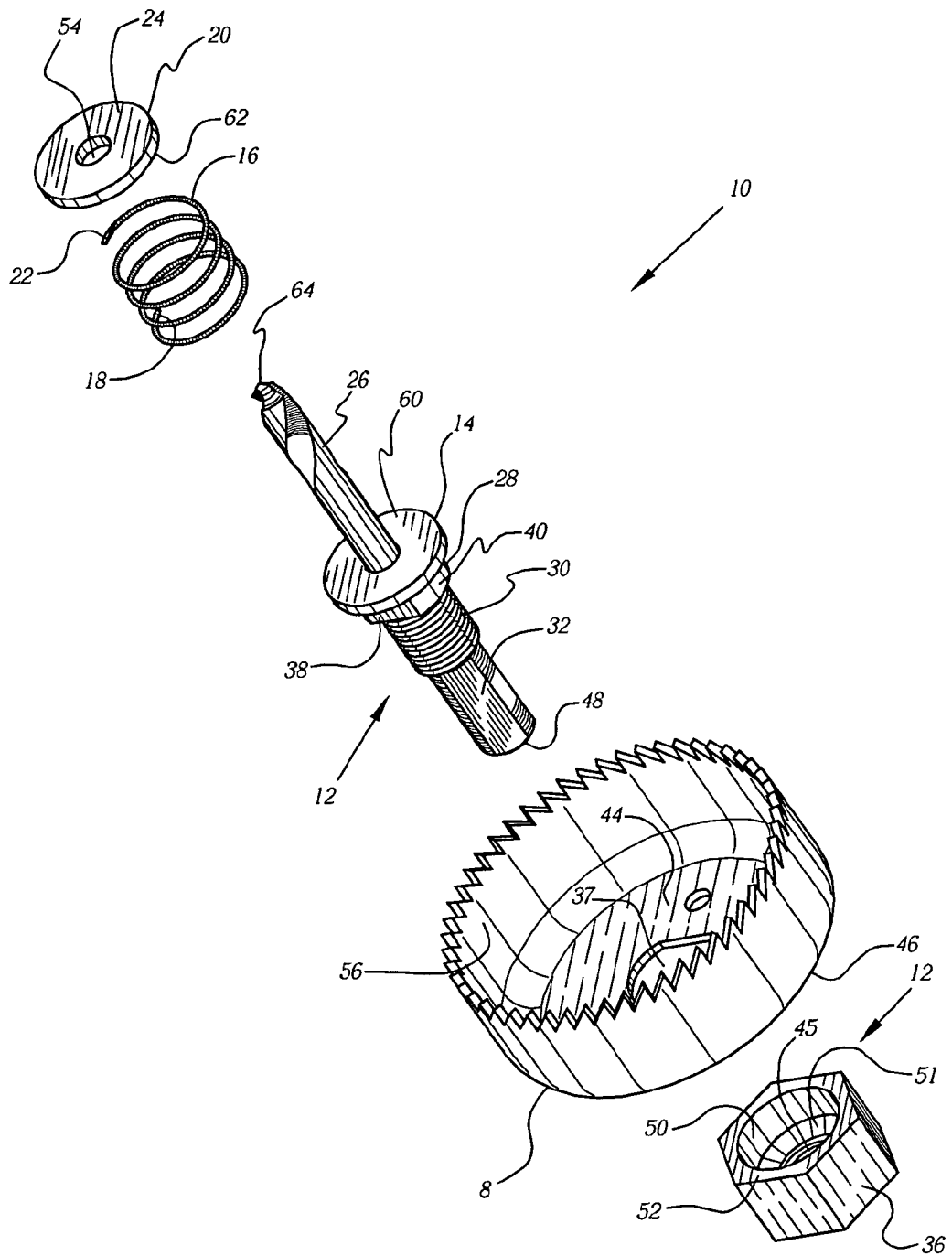
FIG. 1A is an exploded perspective view of a modification of the device of FIG. 1 in accordance with the present invention.
Figure 1B:
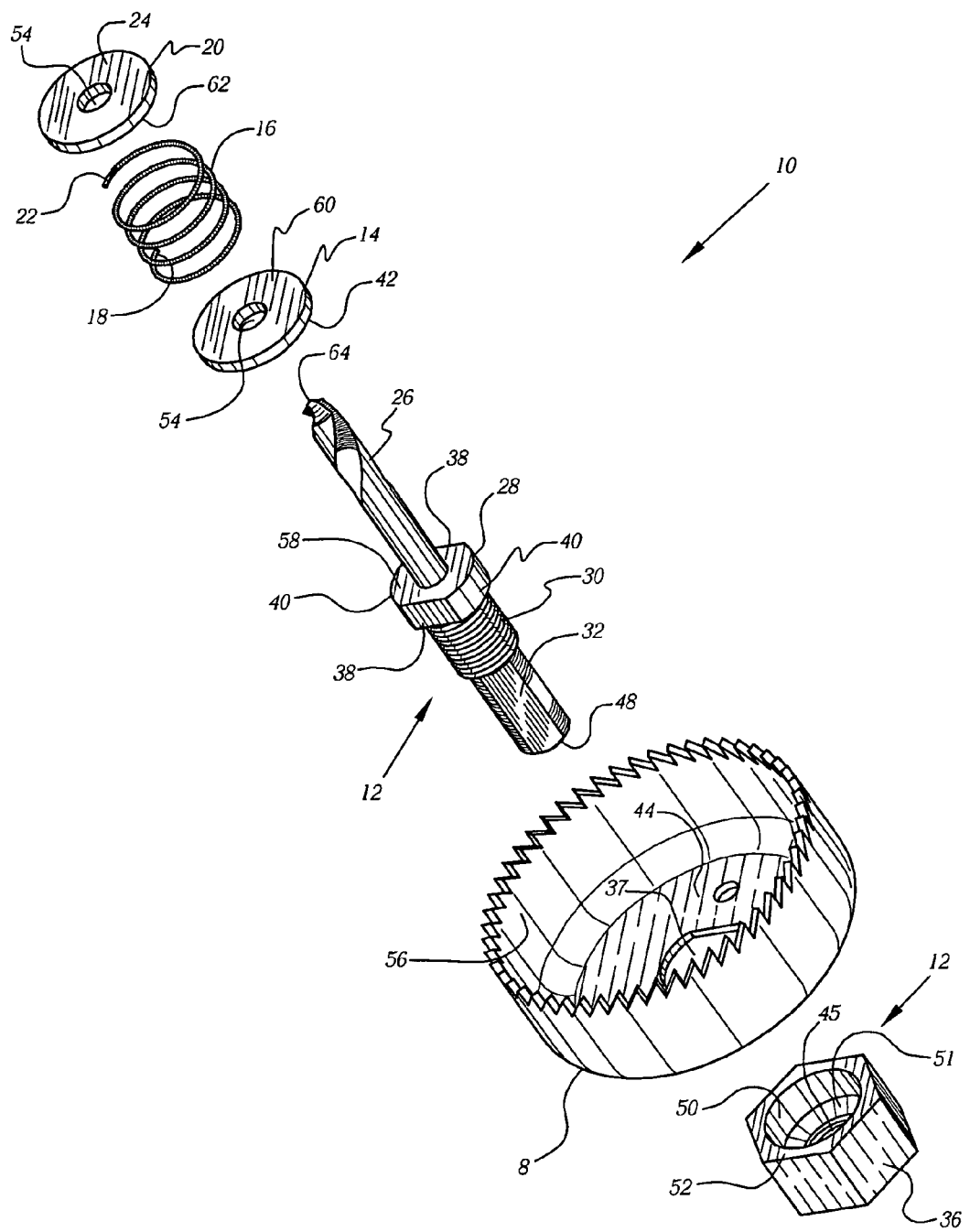
FIG. 1B is an exploded perspective view of another modification of the device of FIG. 1 in accordance with the present invention.

Referring now to FIGS. 1A and 1B, exploded perspective views of modifications of the device of FIG. 1 in accordance with the present invention are depicted. The modification of FIG. 1A is the uncoupling of the second member 20 from the second end 22 of the spring 16. The second member 20 is allowed to "float" upon the spring 16 thereby transferring significant friction and heat from the contacting surfaces of the second member 20 and the workpiece to contacting portions of the second member 20 and the spring 16. The first end 18 of the spring 16 remains joined to the inner wall 60 of the first member 14 for the device 10 of FIGS. 1 and 1A.

The modification of FIG. 1B is the uncoupling of the second member 20 from the second end 22 of the spring 16, and the uncoupling of the first member 14 from the locking member 28. The first end 18 of the spring 16 remains joined to the inner wall 60 of the first member 14. The modification of FIG. 1B transfers significant friction and heat from the contacting surfaces of the second member 20 and the workpiece (FIG. 1) to contacting portions of the second member 20 and the spring 16, and contacting portions of the first member 14 and the locking member 28. The modification of FIG. 1B distributes the friction and heat between the workpiece, the spring 16, the first and second securing members 14 and 20, and the locking member 28 thereby reducing the possibility of damaging any component of the device 10.

Figure 6:
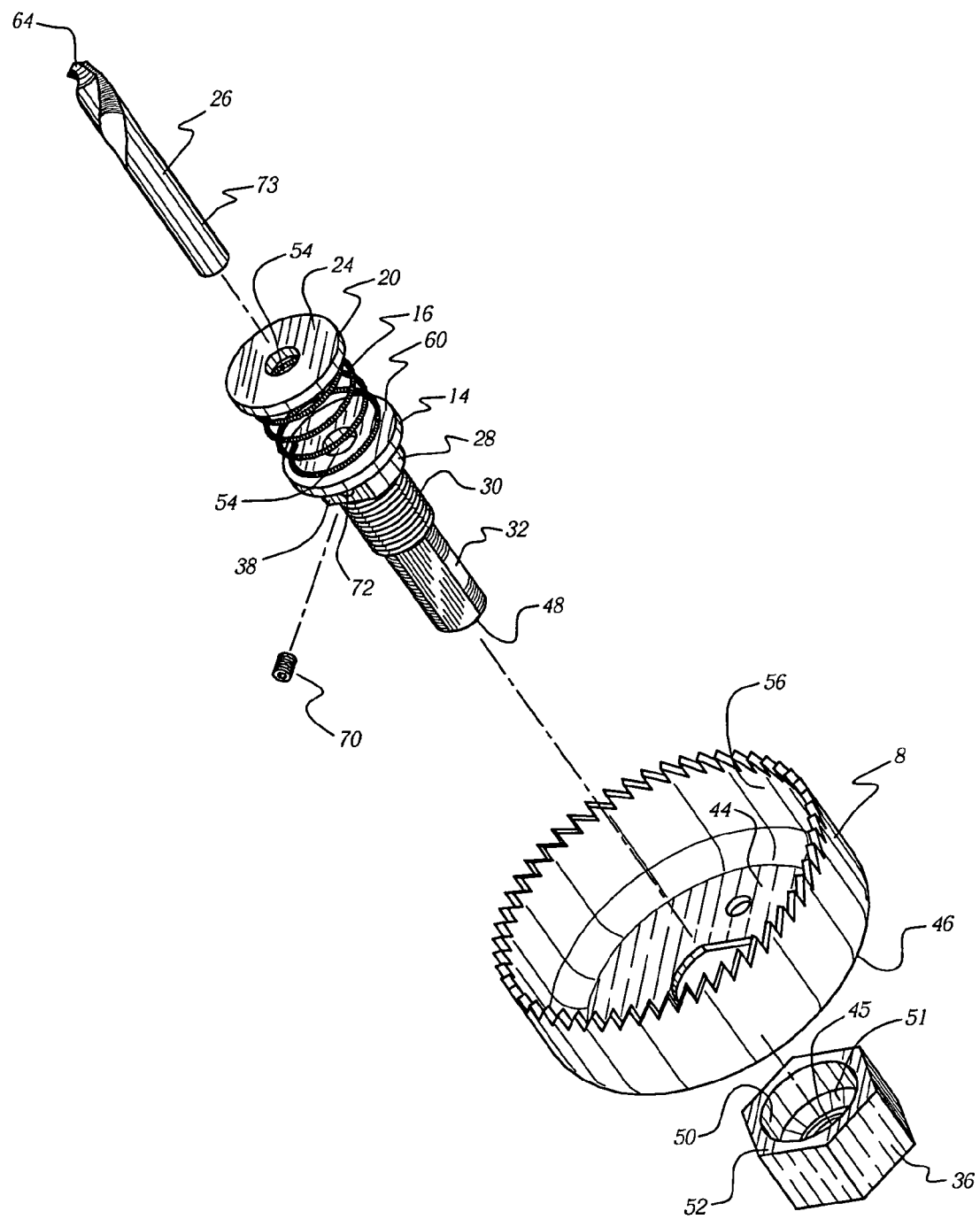
FIG. 6 is an exploded perspective view of an alternative design for the device of FIG. 1 in accordance with the present invention.

Referring now to FIG. 6, an exploded perspective view of an alternative design for the device of FIG. 1 in accordance with the present invention is depicted. The alternative design of FIG. 6 is the replaceability of the drill bit 26. The drill bit 26 inserts into a recess that is aligned with the orifice 54 of the first member 14. The position of the drill bit 26 is secured via a set screw 70 inserted into a threaded orifice 72 in a planar wall 38 of the locking member 28. The threaded orifice 72 intersects the recess that receives the drill bit 26. The set screw 70 is tightened until it engages a stem or shank portion 73 of the drill bit 26. Should the drill bit 26 become dulled or otherwise not effective, or should an alternative bit 26 be required, the inserted drill bit 26 is easily replaced by loosening the set screw 70.

Figure 7:
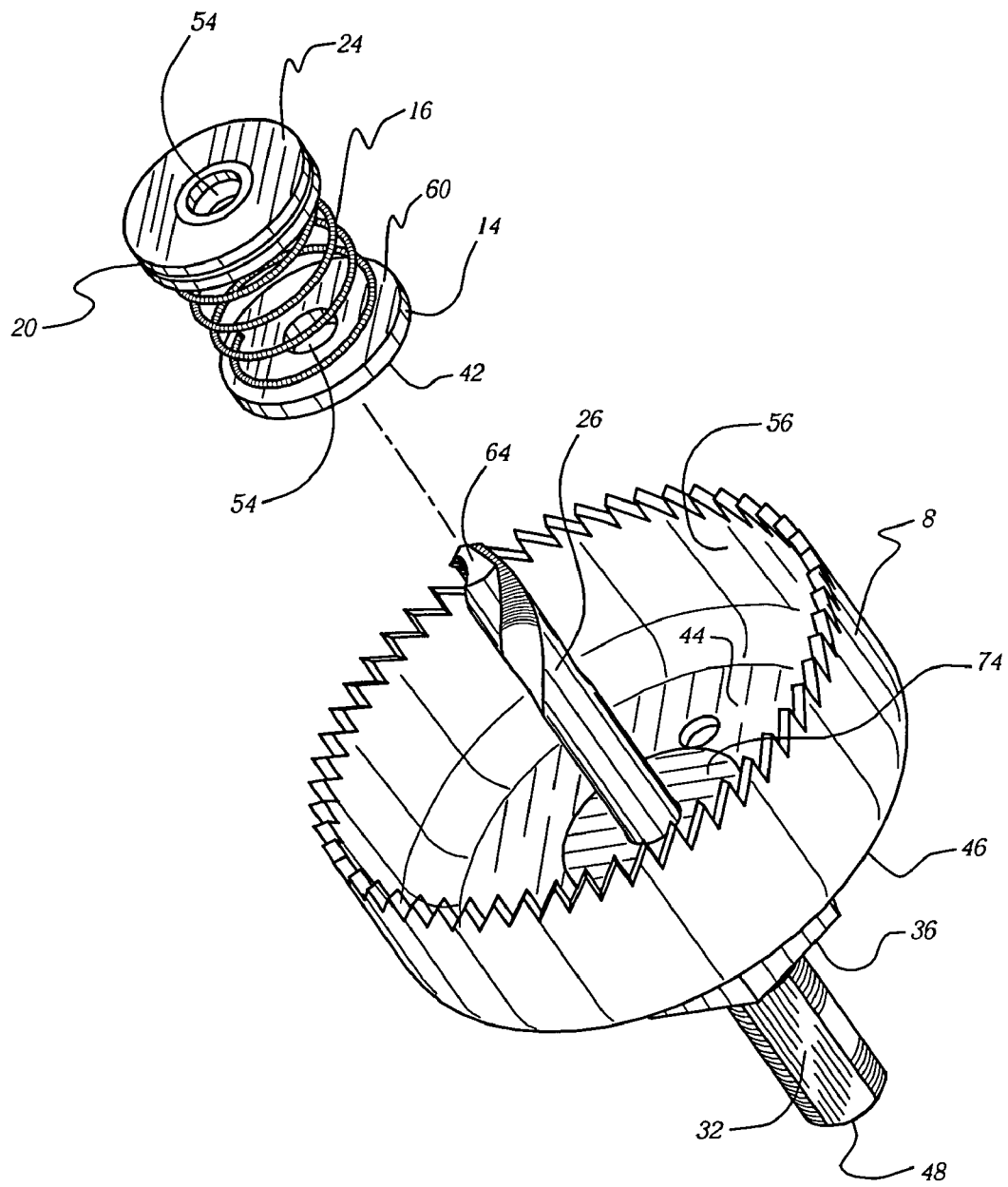
FIG. 7 is an exploded perspective view of another alternative design for the device of FIG. 1 in accordance with the present invention.

Referring now to FIG. 7, an exploded perspective view of another alternative design for the device of FIG. 1 in accordance with the present invention is depicted. The alternative design of FIG. 7 includes the uncoupling of the first member 14 from the locking member 28, and the integral joining of a washer 74 to the inner wall 44 of the hole saw 8. The alternative design of FIG. 7 allows the integrally joined biasing spring 16 and securing members 14 and 20, to "ride" upon the washer 74 via the outer wall 42 of the first member 14. This design permits the spring 16 and securing members 14 and 20 to be quickly replaced when a fatigued spring 16 or an alternative spring 16 is required. Further, the design transfers friction from the second member 20 depicted in FIG. 1 to both the first and second members 14 and 20 depicted in FIG. 7 thereby increasing the longevity of all components.

Figure 8:
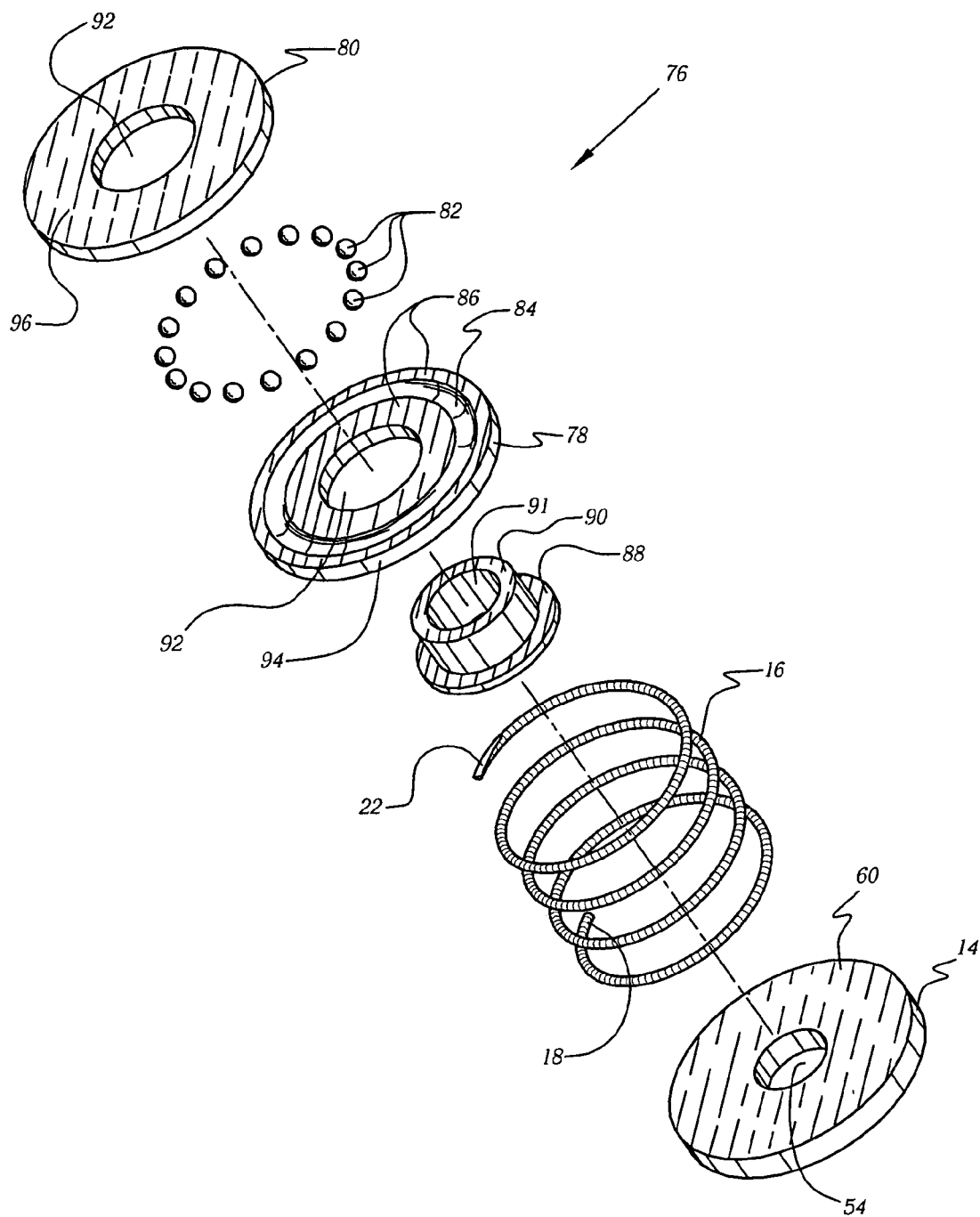
FIG. 8 is an exploded perspective view of still another alternative design for the device of FIG. 1 in accordance with the present invention.

Referring now to FIG. 8, an exploded perspective view of another alternative design for the device of FIG. 1 in accordance with the present invention is depicted. The alternative design of FIG. 8 replaces the second securing member 20 with a bearing assembly 76 that includes an inner raceway 78, an outer raceway 80 and a plurality of frictionless ball bearings 82 sandwiched therebetween in annular channels 84 such that inner planar walls 86 of the raceways 78 and 80 remain separated. The raceways 78 and 80 are cooperatively held together via a securing member 88 that includes a hub portion 90, which is forcibly inserted through apertures 92 in the raceways 78 and 80 thereby capturing the raceways and the bearings 82 therein. The hub portion 90 includes and orifice 91 that facilitates the insertion of the drill bit 26 through the bearing assembly 76, spring 16, first securing member 14 and into the locking member 28.

The raceways 78 and 80 are permanently sealed with greased bearings 82 therein to negate the systematic lubrication of the bearings 82. Instead of utilizing sealed bearings, a standard bearing configuration with a grease zerk for routine lubrication may be used. The first end 18 of the spring 16 is integrally joined to the inner wall 60 of the first securing member 14. The second end 22 of the spring 16 is integrally joined to an outer wall 94 of the inner raceway 78. In operation, an outer wall 96 of the outer raceway 80 engages the surface of a workpiece. Upon energizing a rotary drive tool, the device 10 rotates except for the outer raceway 80, which maintains its position relative, the workpiece thereby preventing friction and heat generation between the device and the workpiece.

Figure 9:
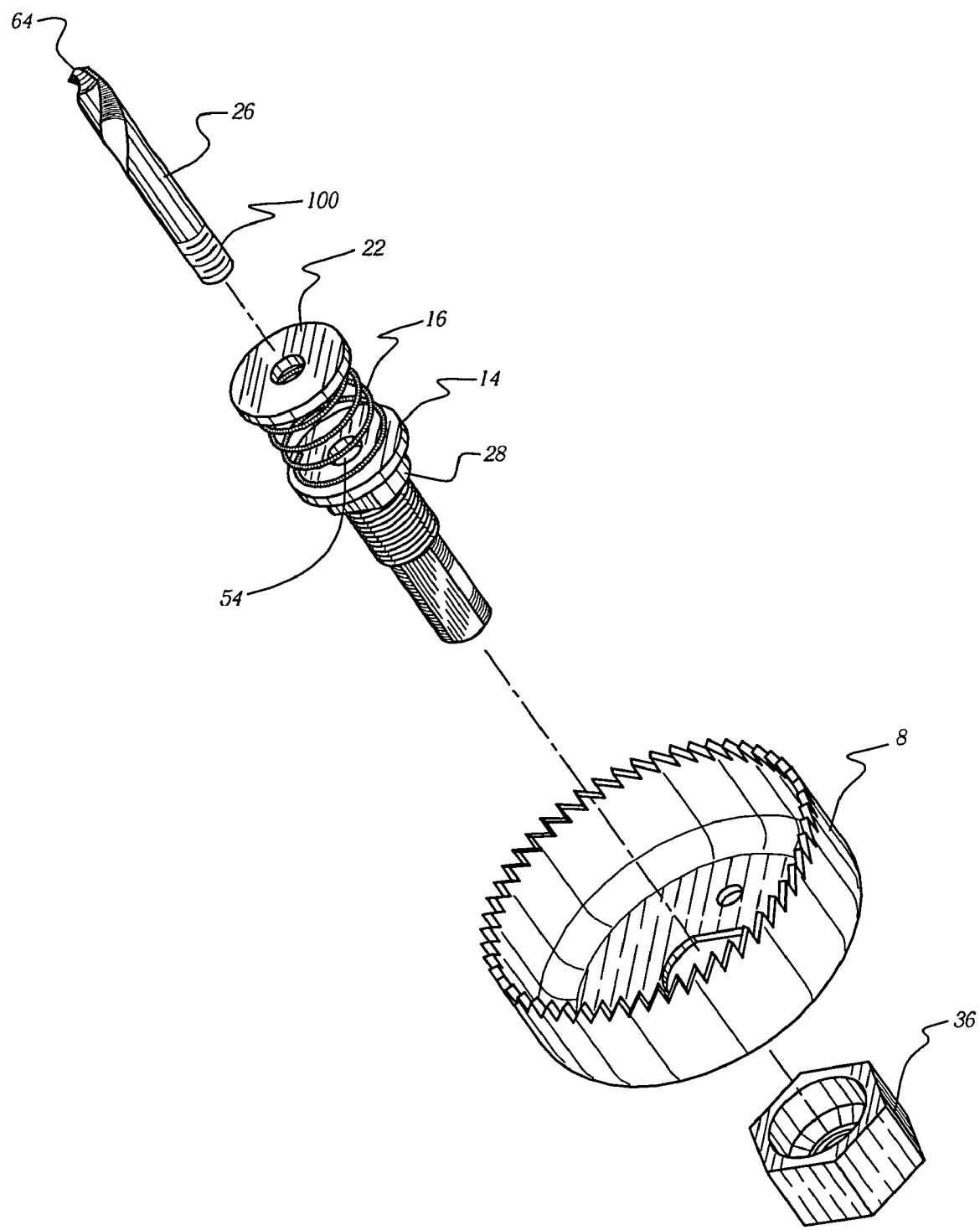
FIG. 9 is an exploded perspective view of a modification of the alternative design of FIG. 6.

Referring now to FIG. 9, an exploded perspective view of an alternative design for the device of FIG. 6 in accordance with the present invention is depicted. The alternative design of FIG. 9 uses a drill bit 26 with a threaded stem or shank portion 100 that is screwed into a cooperatively threaded receiving recess (not pictured) in the locking member 28. The receiving recess is axially aligned and cooperatively configured with the central aperture 54 in the first securing member 14 to promote the snug insertion of the shank portion 100 into the receiving recess. The design of FIG. 9 deletes the set screw 70 of FIG. 6 thereby reducing the number of components required to secure the drill bit 26 to the locking member 28.

Figure 10:
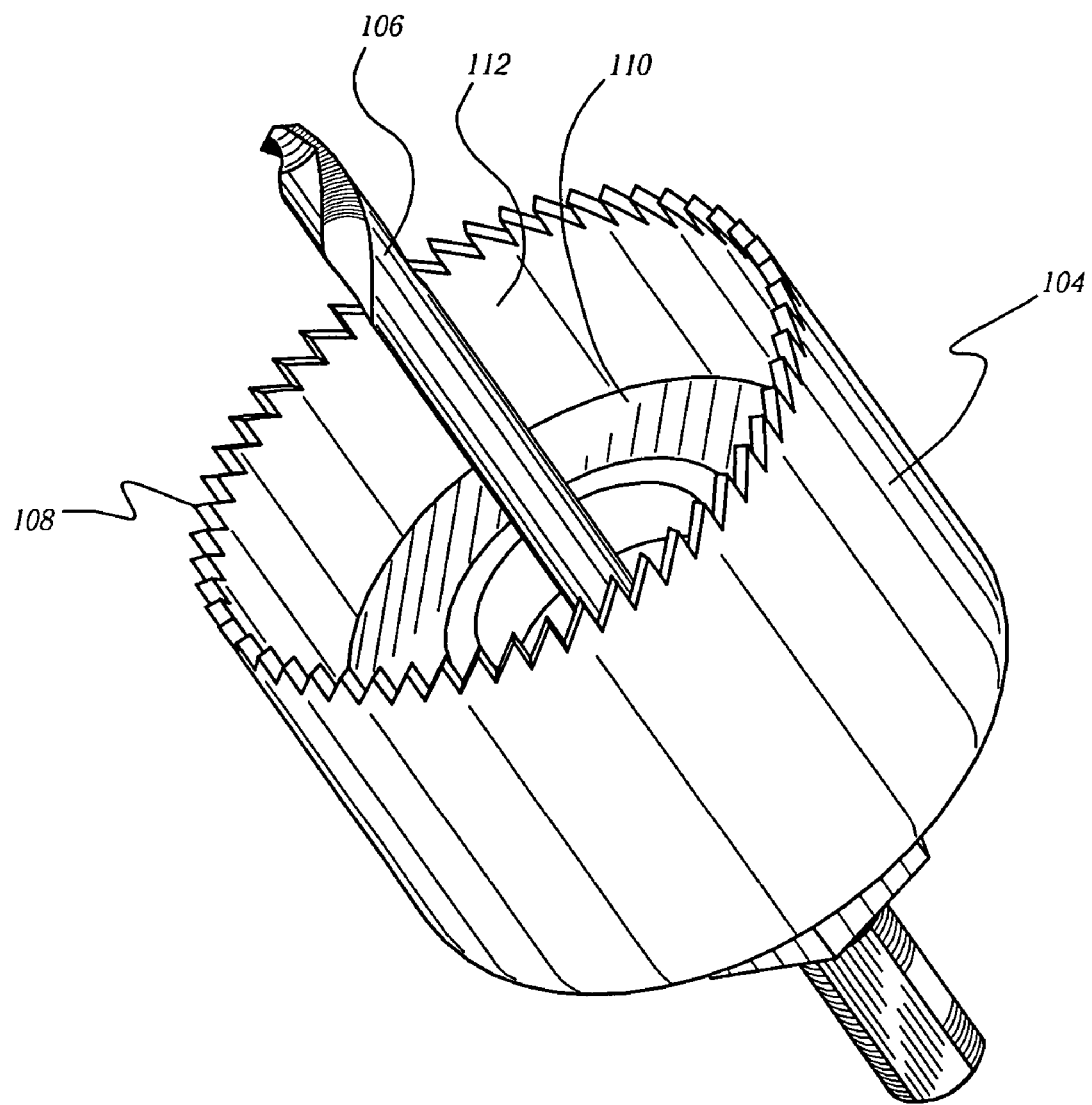
FIG. 10 is a perspective view of a hole saw with a drill bit protruding therefrom, the hole saw having a relatively large longitudinal axis to encase the device in accordance with the present invention.

Referring now to FIG. 10, a perspective view of a hole saw 104 with a drill bit 106 protruding therefrom is depicted in accordance with the present invention. The hole saw 104 (now part of the invention) includes a slightly tapered configuration and relatively longer axial dimension than the hole saw 8 above. The tapered configuration provides a cutting edge 108 that is relatively smaller in diameter than the bottom wall 110 of the saw 104. The longer axial dimension results in more of the severed portion 66 being contained inside the hole saw 104 after the spring 16 of the device 10 has expanded to a non-biased position. A larger portion of the severed portion 66 being contained inside the saw 104, "assists" the drill bit 106 in retaining the severed workpiece portion 66 upon the bit 106 as the hole saw 104 is removed from the workpiece thereby preventing the severed portion 66 from falling from the bit 106 and obstructing the newly cut hole. The tapered configuration promotes the quick manual removal of the severed preselected portion 66 from the hole saw 104 by decreasing the surface area of engagement between a conically configured inner wall 112 of the hole saw 104 and the cylindrically configured outer wall of the severed portion 66.

Figure 11:
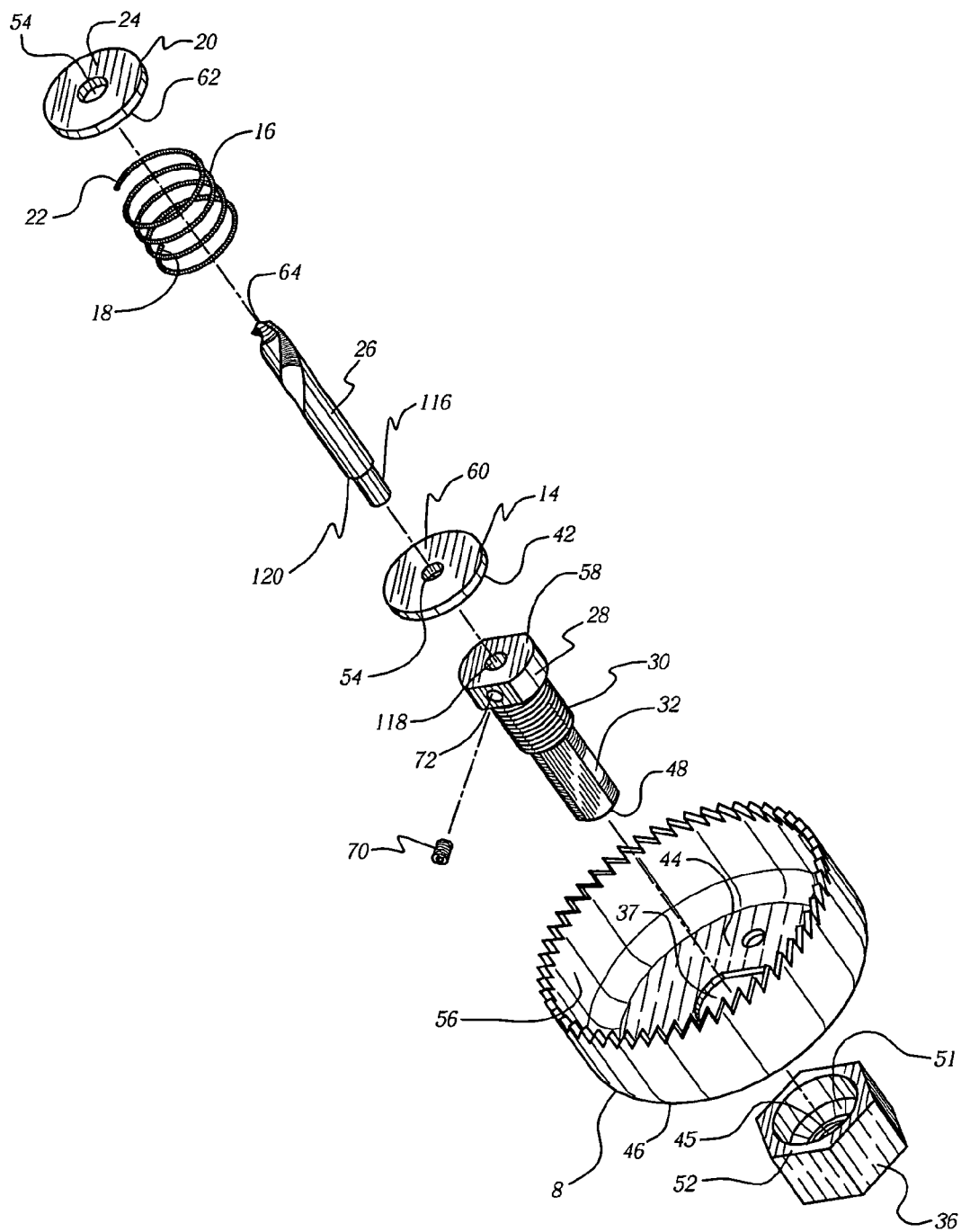
FIG. 11 is an exploded perspective view of a modification of the device of FIG. 6 in accordance with the present invention.

Referring now to FIG. 11, an exploded perspective view of a modification of the device of FIG. 6 in accordance with the present invention is depicted. The device of FIG. 11 includes a drill bit 26 having an insertion end portion 116 with a reduced diameter that allows the insertion end 116 to snugly insert through the central orifice 54 of the first securing member 14. The insertion end portion 116 is axially dimensioned to extend through the first securing member 14 and into the locking member 28 via recess 118 such that the set screw 70 captures the end portion 116. The drill bit is disposed to rotatably capture the first securing member 14 between a rim wall 120, formed by the reduced end portion 116, and the outer wall 58 of the locking member 28. The second securing member 20 is integrally joined to the spring 16, and the spring is integrally joined to the rotatable securing member 14 thereby forming a "spool" that can be rotated upon the drill bit 26 while being maintained at a predetermined position.

In operation, the drill bit 26 penetrates a workpiece and disposes the outer wall 24 of the second securing member 20 against a workpiece, the hole saw 8 starts to cut the workpiece and the spring 16 begins to compress. The force generated by the spring 16 coupled with the coefficient of friction between the outer wall 24 of the second securing member 20 and the workpiece, prevents the spool from rotating thereby transferring friction and wear between the stationary outer wall 42 of the first member 14 and the rotating outer wall 58 of the locking member 28. No friction would occur between the rim wall 120 of the bit 26 and the inner wall 60 of the first securing member 14 due to a slight separation between the walls 120 and 60 resulting from the compressed spring 16. The damage that would ordinarily result from the friction generated between the outer walls 42 and 58 is negated with the application of oil, grease or similar lubricant to the insertion end 116 of the bit 26, and the inner and outer walls 60 and 42 of the first securing member 14.

Workpiece Removal Device

Figure 12:
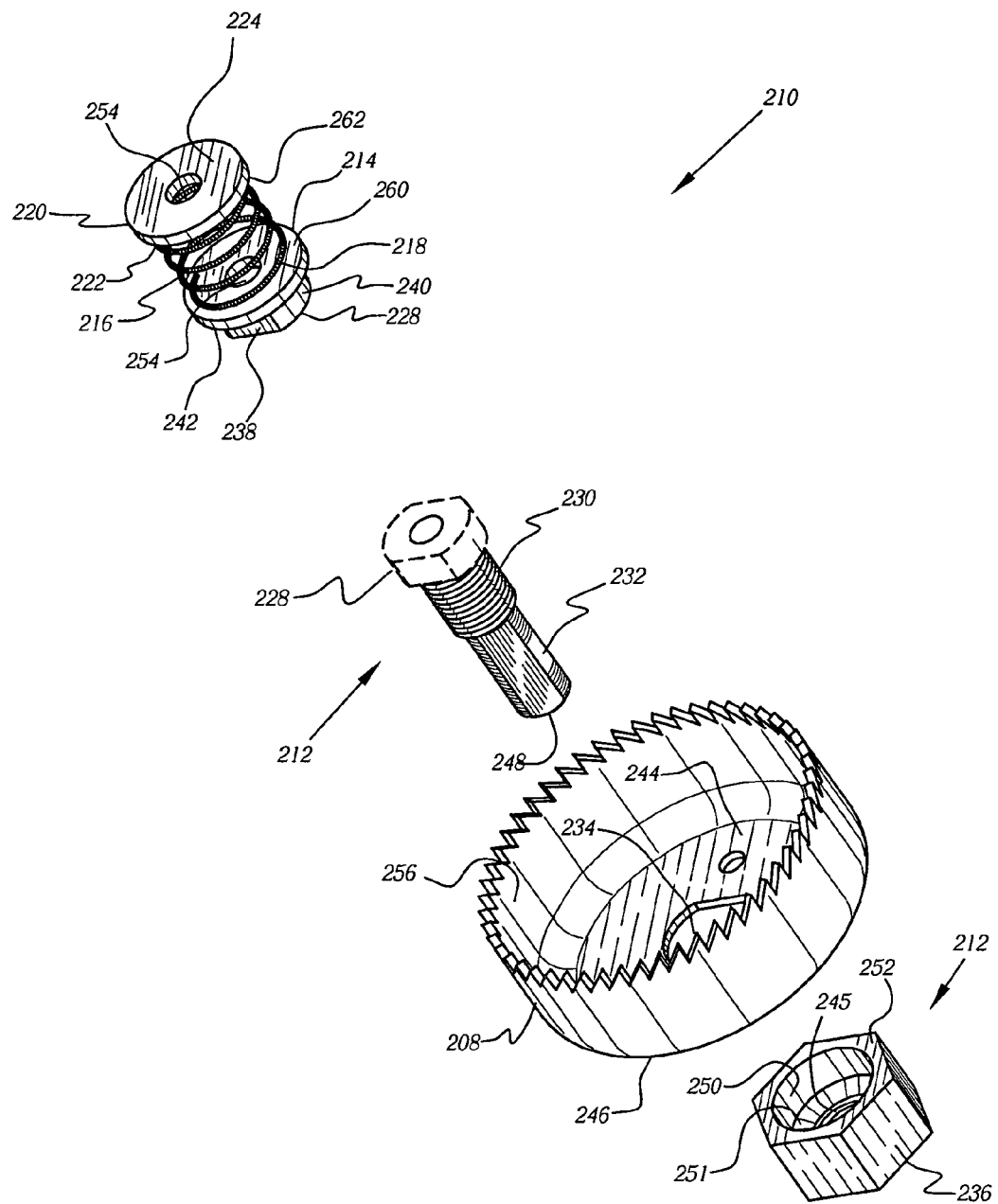
FIG. 12 is an exploded perspective view of a workpiece removal device for a plug cutter in accordance with the present invention.
Figure 14:
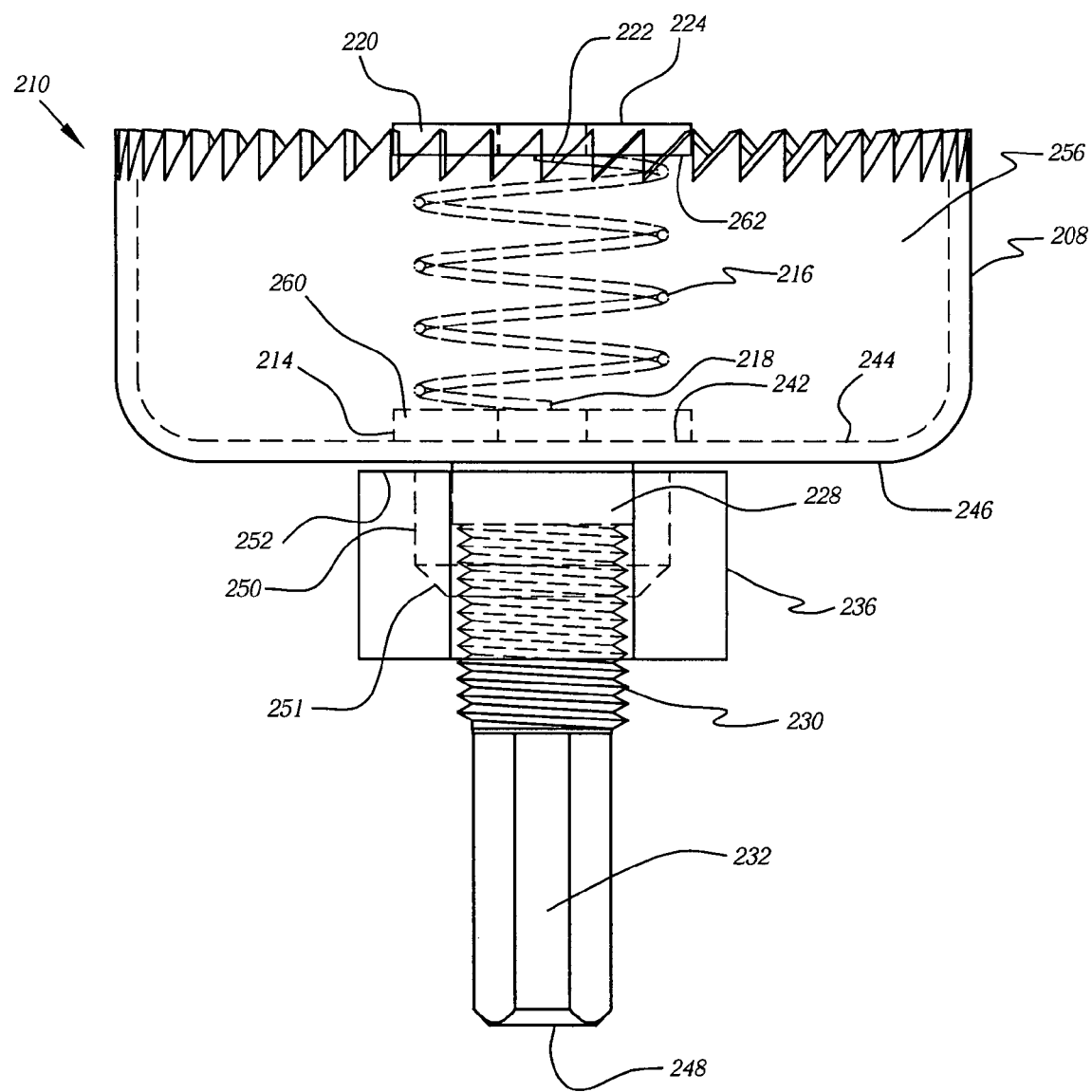
FIG. 14 is a side elevation view of the device secured to a plug cutter, the device includes a biasing spring in a non-biased position.
Figure 15:
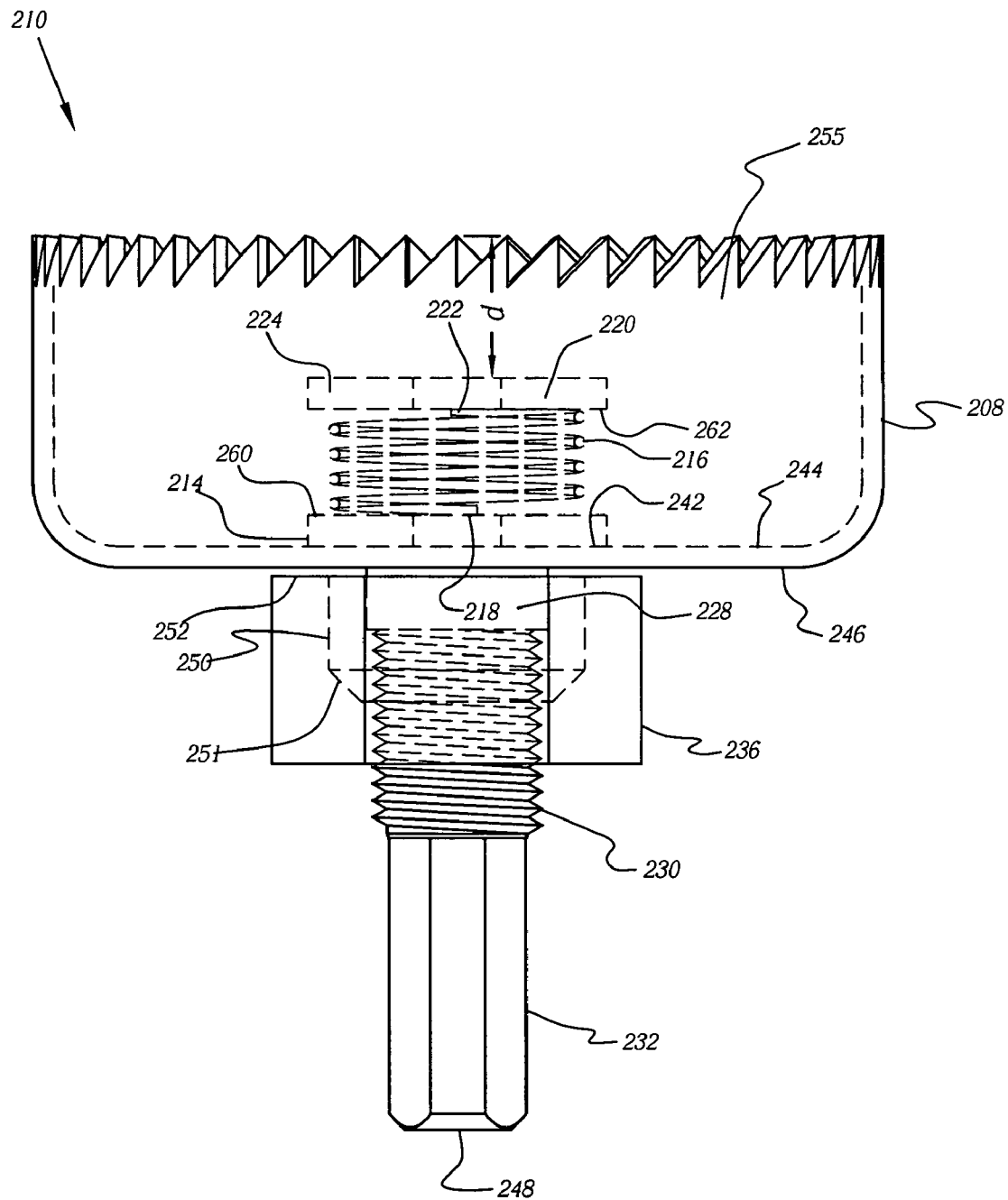
FIG. 15 is a side elevation view of the device and plug cutter of FIG. 14 except that the biasing spring is in a biased position.

Referring now to FIGS. 12, 14 and 15, a workpiece removal or plug expulsion device designated as numeral 210 used with a plug cutter 208 is depicted, the plug cutter 208 having a first closed end, a second open end and a longitudinal wall or surface extending therebetween. The device 210 is fabricated from metal with carbon steel being the material of choice, although other materials of suitable strength and hardness are contemplated.

It is contemplated that plug cutter 208 has a plurality of blades, or tines 270 (best viewed in FIGS. 13A and 13B), extending axially outwardly from at least one end (proximate the second open end for example). The figures depict a plurality of tines forming a sawtooth pattern. However, in at least one embodiment, the plug cutter 208 may be formed having substantially fewer tines or blades for example, where each blade or group of blades is separated by an opening or cutout formed therebetween. Such openings may be used to readily eject shavings created when a plug is being cut.

It should be appreciated that the plurality of cutting tines 270 defines a periphery of a central bore (or internal cavity 256), where the configuration of the plug produced using the plug cutter 208 corresponds generally to the configuration of the bore. In at least one embodiment, the cutting tines define a central bore that is generally circular in cross section, resulting in a generally circular plug. However, it is contemplated that the central bore may be slightly tapered along at least a portion of its length, such that the diameter of the bore at the tips of the tines or blades 270 is slightly smaller than the diameter of the bore at the opposing (i.e. proximal) end. Such a combination will allow the plug to slide more easily out of the plug cutter 208 when the cutting operation is completed.

Blade Shape Detail

It is also contemplated that the tines or blades may or may not have radially relieved portions on at least one surface thereof. For plug cutters that do not include radially relieved portions (on an least a portion of an interior surface of the tines or blades for example) the entire inner surface of each tine or blade lies at a constant radial distance from the center of the bore. In other words, the entire inner surface of each blade contacts the outer surface of the plug as it is being cut from the workpiece material. Friction between the outer surface of the plug and the inner surface of the blades generates a sufficiently large torque on the plug, causing the plug to break away from the workpiece and become positioned in the central bore of the plug cutter 208.

Figure 13A:
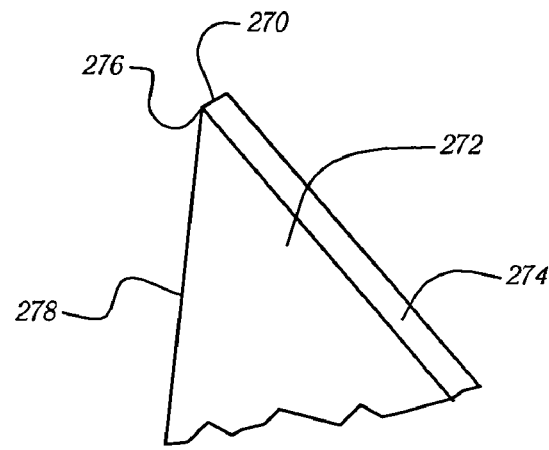
FIG. 13A is an enlarged view of one the tines of the plug cutter, as viewed from the bore, showing the tine without a radially relieved portion.
Figure 13B:
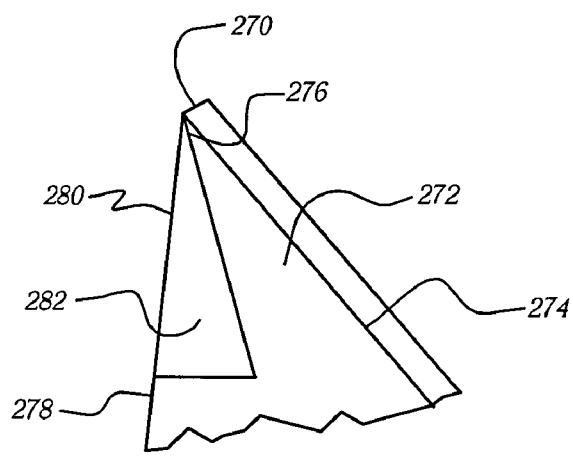
FIG. 13B is an enlarged view of one of the tines of the plug cutter, as viewed from the bore, showing a radially relieved portion on the inner surface thereof.

As shown in FIGS. 13A and 13B, each tine 270 has an inner surface 272 facing generally inwardly toward the center of bore 256 (i.e., toward the axis of rotation of the plug cutter 208 for example). Inner surface 272 of each tine 270 commences with a leading edge 274 that extends axially from cutting tip 276 along substantially the entire length of tine 270. Leading edge 274 defines the forwardmost portion of inner surface 272 with respect to the direction of rotation of the plug cutter 208.

Figure 12A:
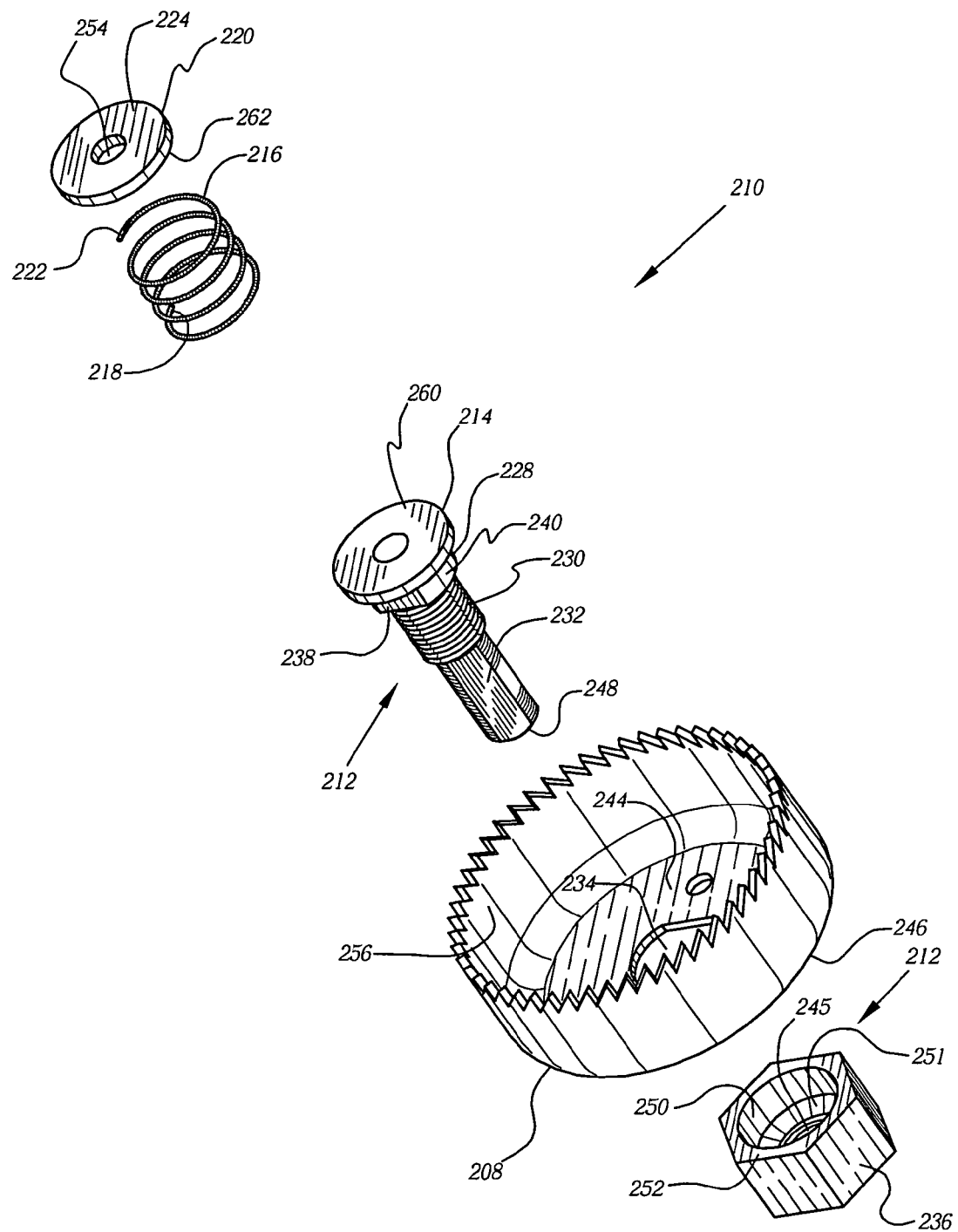
FIG. 12A is an exploded perspective view of a modification of the device of FIG. 12 in accordance with the present invention.
Figure 12B:
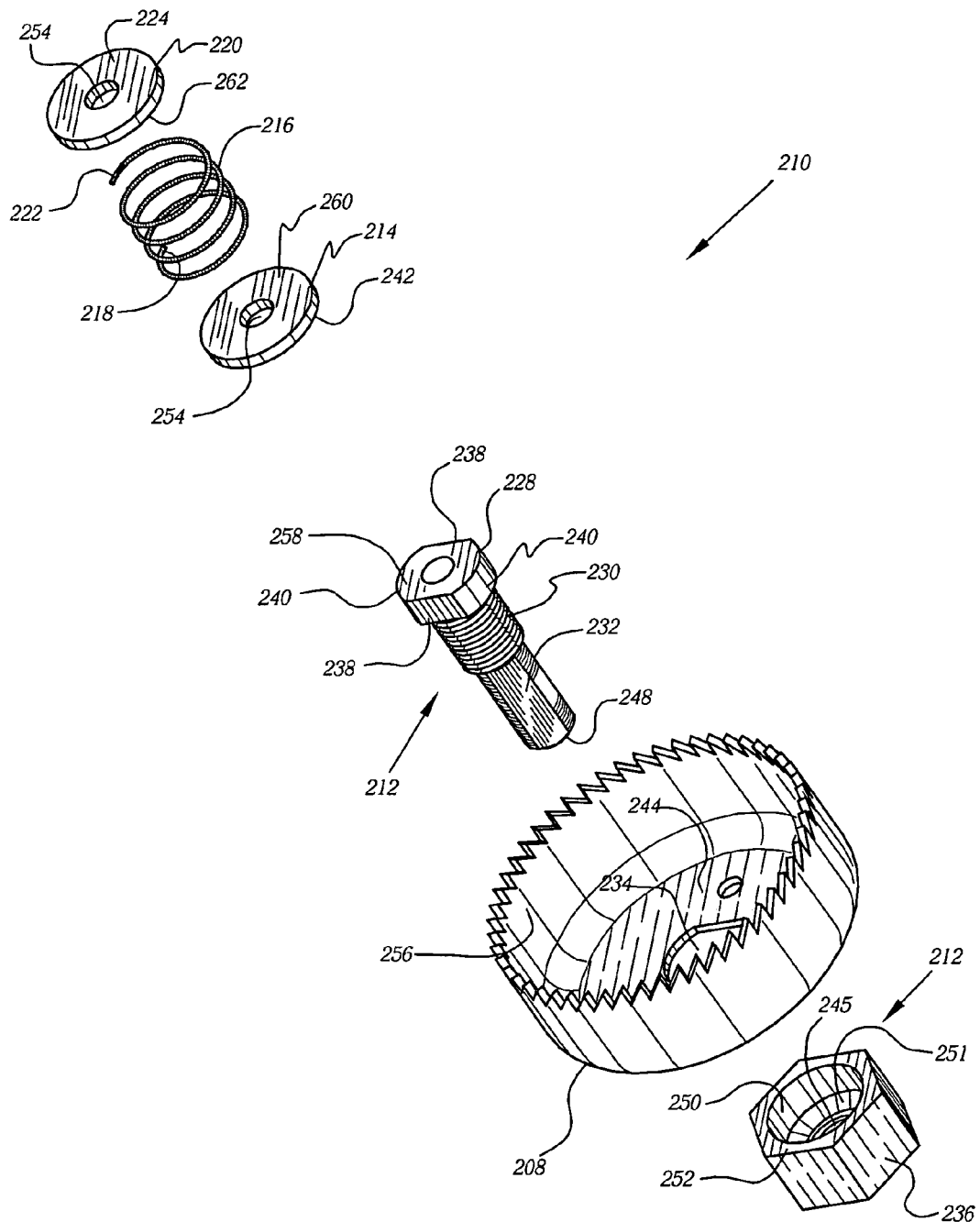
FIG. 12B is an exploded perspective view of another modification of the device of FIG. 12 in accordance with features of the present invention.

In at least one embodiment, leading edge 274 is the cutting edge of the tine 270. As shown in FIGS. 12, 12A and 12B for example, all the leading edges 274 lie substantially on a circle (the circular periphery of the second closed end for example) that generally corresponds to the circumference of bore 256. Inner surface 272 extends from leading edge 274 to a position on tine 270 between leading edge 274 and a trailing edge 278 and is substantially planar, such that, at any given longitudinal (or axial) position along tine 270, leading edge 274 and surface 272 are disposed at a first radius or $R_{tine}$ with respect to the axis of rotation of the plug cutter 208. In at least one embodiment $R_{tine}$ is equal to or approximately equal to the radius of bore 256. It should be appreciated that, in at least one embodiment, leading edge 274 may have a slightly larger (or smaller) radius with respect to the axis of rotation of the plug cutter 208 than surface 272, such that leading edge 274 is angled outwardly (or inwardly) with respect to the inner surface 272.

For plug cutters 208 that include radially relieved portions on one or more of the inner surfaces of the blades similar to that described in U.S. Pat. Nos. 5,810,524 and 6,273,652, each of which is incorporated herein by reference in its entirety, the central bore of the plug cutter 208 is not perfectly circular. At least one tine 270 having at least one radially relieved portion 280 is illustrated in FIG. 13B, such that inner surface 272 are not substantially planar. As illustrated, at any given longitudinal (or axial) position along tine 270, leading edge 274, and inner surface 272, are disposed at $R_{tine}$ with respect to the axis of rotation as provided previously. However, radially relieved portion 280 having radial surface 282, is disposed at a different radius (second radius or $R_{relief}$) from the axis of rotation. It should be appreciated that $R_{relief}$ need not be constant along the entire radial surface 282. However, when $R_{relief}$ is constant, $R_{tine} > R_{relief}$. Thus, for a constant $R_{relief}$, at least a portion of tine 270 is provided with a measure of radial relief. As a plug is being cut using plug cutter 208, a gap is defined between the plug being cut and the radially relieved portion 280, where the gap=>$R_{tine}$–$R_{relief}$. As provided previously, $R_{relief}$ may not be constant over the entire radial surface 282, but may very. In such instance, it is possible that $R_{tine}$ may be equal to or even greater than $R_{relief}$ in some locations.

In the illustrated embodiment, device 210 includes at least one boss or fastening member 212 that is detachably or removably joined to the plug cutter 208, a first securing member 214 integrally joined (via welding or similar methods) to the boss or fastening member 212, a biasing member or spring 216 having a first end 218 integrally joined to the first securing member 214, and a second securing member 220 integrally joined to a second end 222 of the spring 216. An outer wall 224 is ultimately disposed to communicate (irrespective of the orientation of the plug cutter 208) with a preselected portion to promote the severance of the preselected portion from the workpiece (i.e., the plug) by the plug cutter 208. As the plug cutter 208 cuts deeper into the workpiece, the spring 216 is increasingly compressed until the plug cutter 208 severs the preselected portion, whereupon, the spring 216 expands to forcibly remove or eject the severed preselected portion of the workpiece from the plug cutter 208. In one embodiment, the spring may be set to a first precompressed position (See "d" in FIG. 15) within the bore of the hole saw, such that the one or more tines engage the workpiece prior to a portion of the fastening member 212. This also enables producing a plug having a specific length "d" to be produced.

In at least one embodiment, the fastening member or boss 212 includes a locking member 228 having a threaded end portion 230 similar to one or more of the embodiments provided previously. The threaded end portion 230 of the locking member 228 is integrally joined to a shank portion 232. The locking member 228 is configured to be snugly inserted through an aperture 234 and is secured relative to the plug cutter 208 upon the threaded joining of a locking nut 236 to the threaded end portion 230. The shank portion 232 is removably secured to a rotary motion tool (not depicted) adapted to provide rotational force to the plug cutter 208.

In at least one embodiment, the locking member 228 is substantially a standard threaded hex nut including two opposing planar walls 238 and two opposing arcuate walls 240 that insert through aperture 234. The threaded end portion 230 is integrally joined to the locking member 228 via welding or similar methods.

The shank portion 232 has a typical hexagonal configuration for insertion into a standard chuck portion of a rotary drive tool (not shown) and is dimensioned to cooperate with the threaded end portion 230, allowing the locking nut 236 to snugly slide upon the shank portion 232 until the internal threads 245 of the locking nut 236 engage the outer threads of the end portion 230. The locking nut 236 is tightened until forcibly engaging an outer planar wall 246 of the plug cutter 208. The shank portion 232 has a longitudinal dimension that facilitates a slight separation between the threaded end portion 230 and the chuck portion of the rotary drive tool after an end wall 248 of the shank portion 232 engages a corresponding inner wall of the chuck portion.

In at least one embodiment, the locking nut 236 has an internal configuration that includes a cavity 250 that snugly captures the locking member as the threaded end portion 230 engages the internal threads 245 of the nut 236. The cavity 250 includes a conical reducing portion 251 that joins with the internal threads 245 to "funnel" the end portion 230 into threaded engagement with the internal threads 245.

In at least one embodiment, the first and second securing members 214 and 220 include standard washers having central apertures 254 that snugly receive cooperating portions of the fastening member 212 there through. It should be appreciated that while securing members 214 and 220 comprising washers having apertures 254 are illustrated and discussed, securing member 214 and 220 comprising disks (i.e., without washers) are contemplated. Further, at least outer wall 224 having a flat non-marring, non-scratching or low friction surface is contemplated. As such, optionally the securing member 220 defines a substantially smooth and continuous surface sans holes, ridges or other surface alterations (See FIG. 18 for example).

The diameters of the securing members 214 and 220 are relatively larger than the diameter of the spring 216, facilitating a stable joining with the securing members 214 and 220. The spring 216 has sufficient expansion force, after being compressed, to forcibly remove or eject a severed portion of a workpiece (i.e., a plug) from an internal cavity 256 of a plug cutter 208.

In operation, a plug cutter 208 is selected to circularly cut a predetermined portion of a workpiece, forming a plug 226. Based upon the size of the plug portion and the fabrication material for the workpiece, a device 210 is selected to remove or eject the plug from the internal cavity 256. The device 210 is assembled and secured to the plug cutter 208 by inserting the shank portion 232 through the aperture 234, such that an outer wall 242 of a first securing member 214 engages an inner wall 244 of the plug cutter 208, whereupon, locking nut 236 is threaded onto a threaded end portion 230. The locking nut 236 is tightened until the inner end wall 252 of the nut 236 forcibly engages outer wall 246 of the plug cutter 208 thereby rigidly, removably securing the device 210 to the plug cutter 208.

Figure 16:
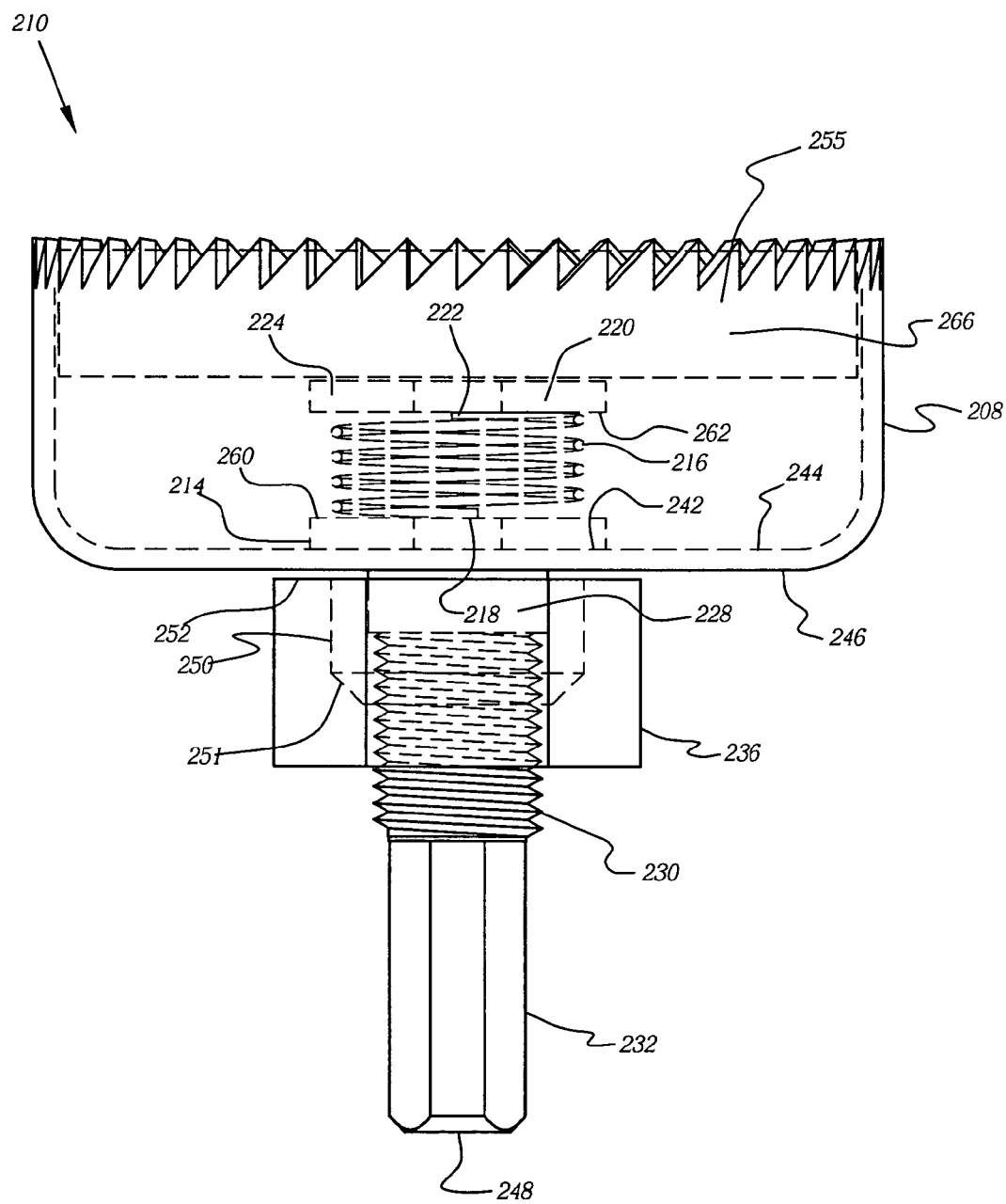
FIG. 16 is a side elevation view of the device and plug cutter of FIG. 15 except that a severed portion of a workpiece is inside the plug cutter compressing the biasing spring.
Figure 17:
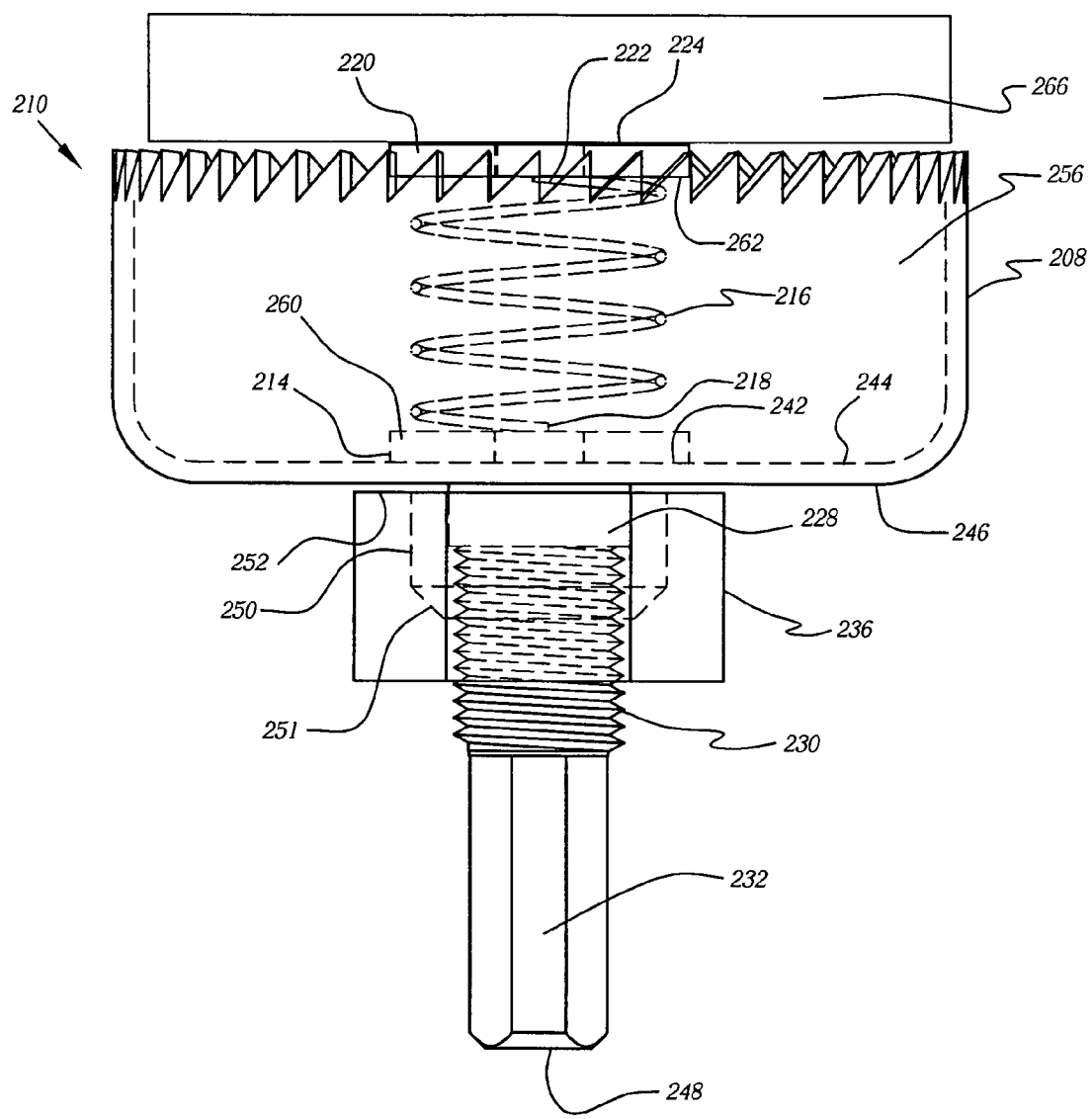
FIG. 17 is a side elevation view of the device and plug cutter of FIG. 15 except that the severed portion of the workpiece is depicted removed from the plug cutter by the biasing spring expanding to its non-biased position.

After securing the device 210 to the plug cutter 208, the shank portion 232 is removably inserted into a rotary power tool for example. Plug cutter 208 is positioned upon the predetermined portion of the workpiece that is to be cut. The rotary power tool is then energized, forcibly driving the plug cutter 208 into the workpiece. The plug cutter 208 continues to penetrate the work piece until the plug cutter 208 completely severs the plug, resulting in compressing the spring 216 and the disposition of the plug 266 in the internal cavity 256 as depicted in FIG. 15. The plug cutter 208 is then manually separated from or disengages the workpiece resulting in the spring 216 expanding to forcibly remove or eject the plug from the internal cavity 256 of the plug cutter 208 simultaneously or substantially simultaneously as depicted in FIG. 16, allowing the plug cutter 208 to be used to form another plug.

Referring now to FIGS. 12A and 12B, exploded perspective views of modifications of the device of FIG. 12 in accordance with the present invention are depicted. The modification depicted in FIG. 12A comprises the second member 220 being reversibly coupled to the second end 222 of the spring 216. The second member 220 transfers significant friction and heat from the contacting surfaces of the second member 220 and the workpiece to contacting portions of the second member 220 and the spring 216.

The modification depicted in FIG. 12B comprises the second end 222 of the spring 216, and the uncoupling of the first member 214 from the locking member 228. In at least one embodiment, the first end 218 of the spring remains joined to the inner wall 260 of the first member 214 The modification of FIG. 12B transfers significant friction and heat from the contacting surfaces of the second member 220 and the workpiece. The modification of FIG. 12B distributes the friction and heat between the workpiece, the spring 216, the first and second securing members 214 and 220, and the locking member 228 thereby reducing the possibility of damaging any component of the device 210.

Figure 18:
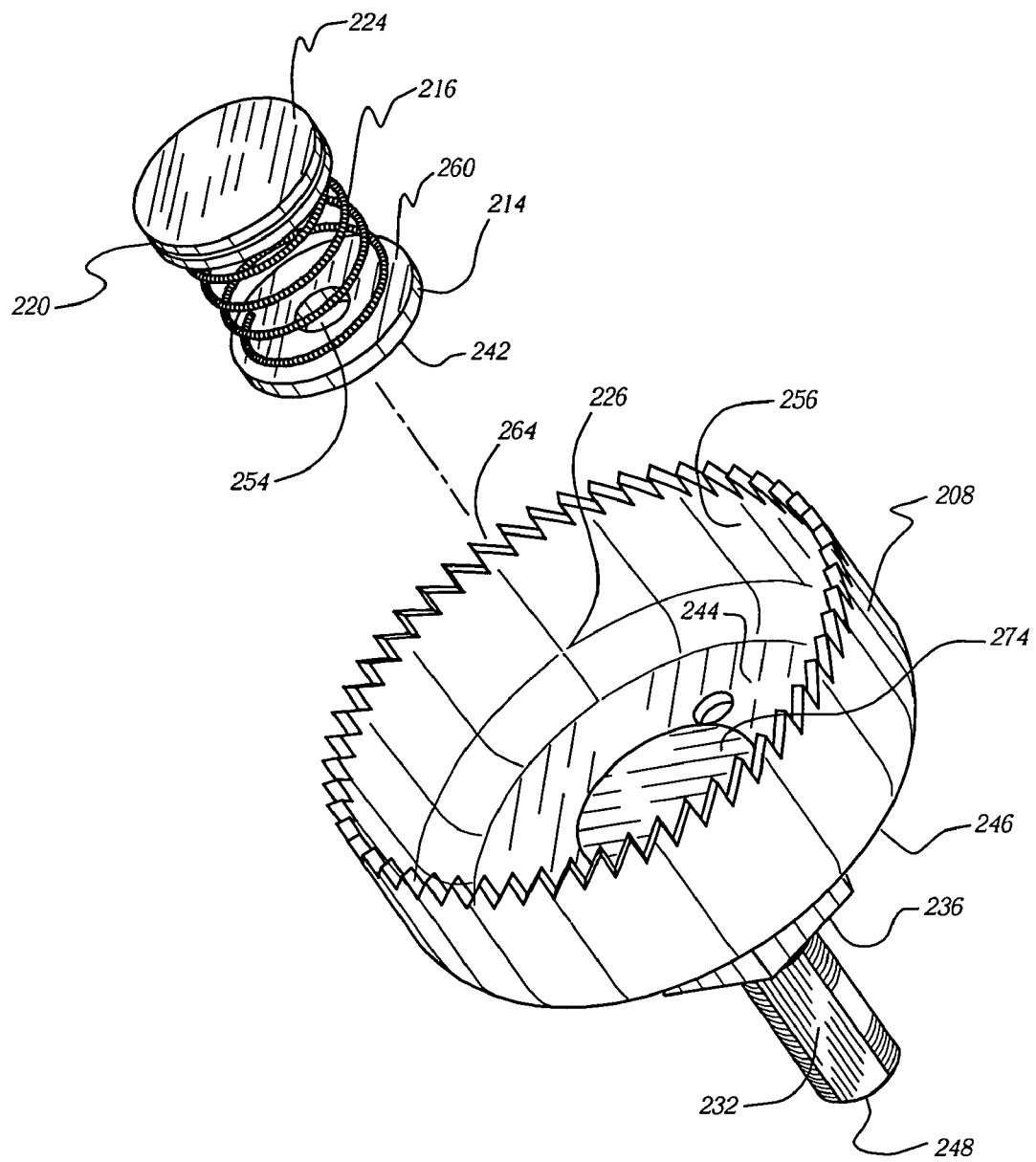
FIG. 18 is an exploded perspective view of another alternative design for the device of FIG. 12 in accordance with features of the present invention.

Referring now to FIG. 18, an exploded perspective view of another alternative design for the device of FIG. 12 in accordance with the present invention is depicted. The alternative design of FIG. 18 includes the uncoupling of the first member 214 from the locking member 228, and the integral joining of a washer 274 to the inner wall 244 of the plug cutter 208. The alternative design of FIG. 18 allows the integrally joined biasing spring 216 and securing members 214 and 220, to contact and rotatably communicate with the washer 274 via the outer wall 242 of the first member 214. This design permits the spring 216 and securing members 214 and 220 to be quickly replaced when a fatigued spring needs replacing or a spring of alternate compressive force is required.

Figure 19:
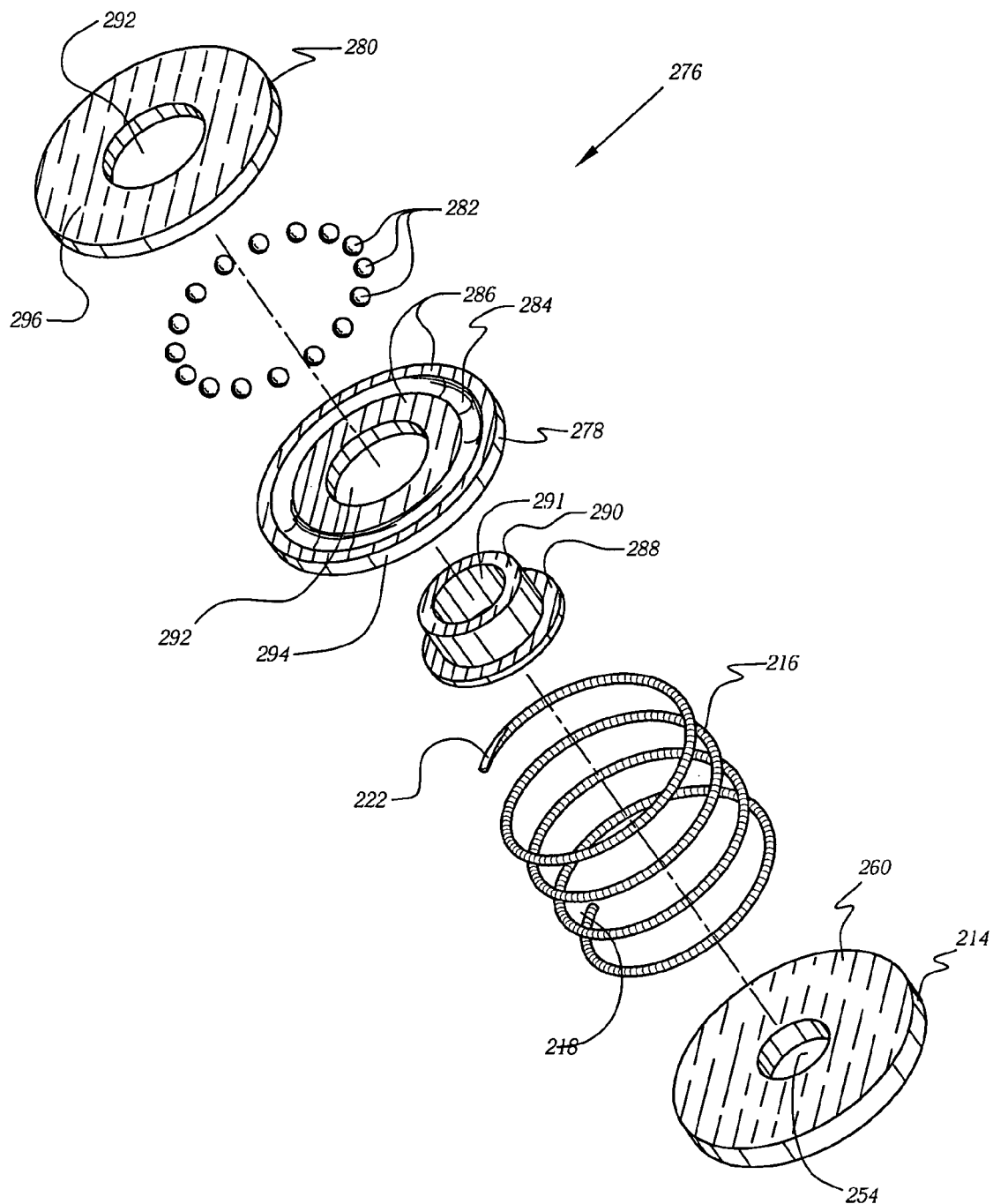
FIG. 19 is an exploded perspective view of still another alternative design for the device of FIG. 12 in accordance with the present invention.

Referring now to FIG. 19, an exploded perspective view of another alternative design for the device of FIG. 12 in accordance with the present invention is depicted. The alternative design depicted in FIG. 19 comprises replacing the second securing member 220 with a bearing assembly 276 that includes an inner raceway 278, an outer raceway 280 and a plurality of frictionless ball bearings 282 sandwiched there between in annular channels 284 such that inner planar walls 286 of the raceways 278 and 280 remain separated. The raceways 278 and 280 are cooperatively held together via a securing member 288 that includes a hub portion 290 having orifice 291 which is forcibly inserted through apertures 292 in the raceways 278 and 280 thereby capturing the raceways and the bearings 282 therein.

Figure 20:
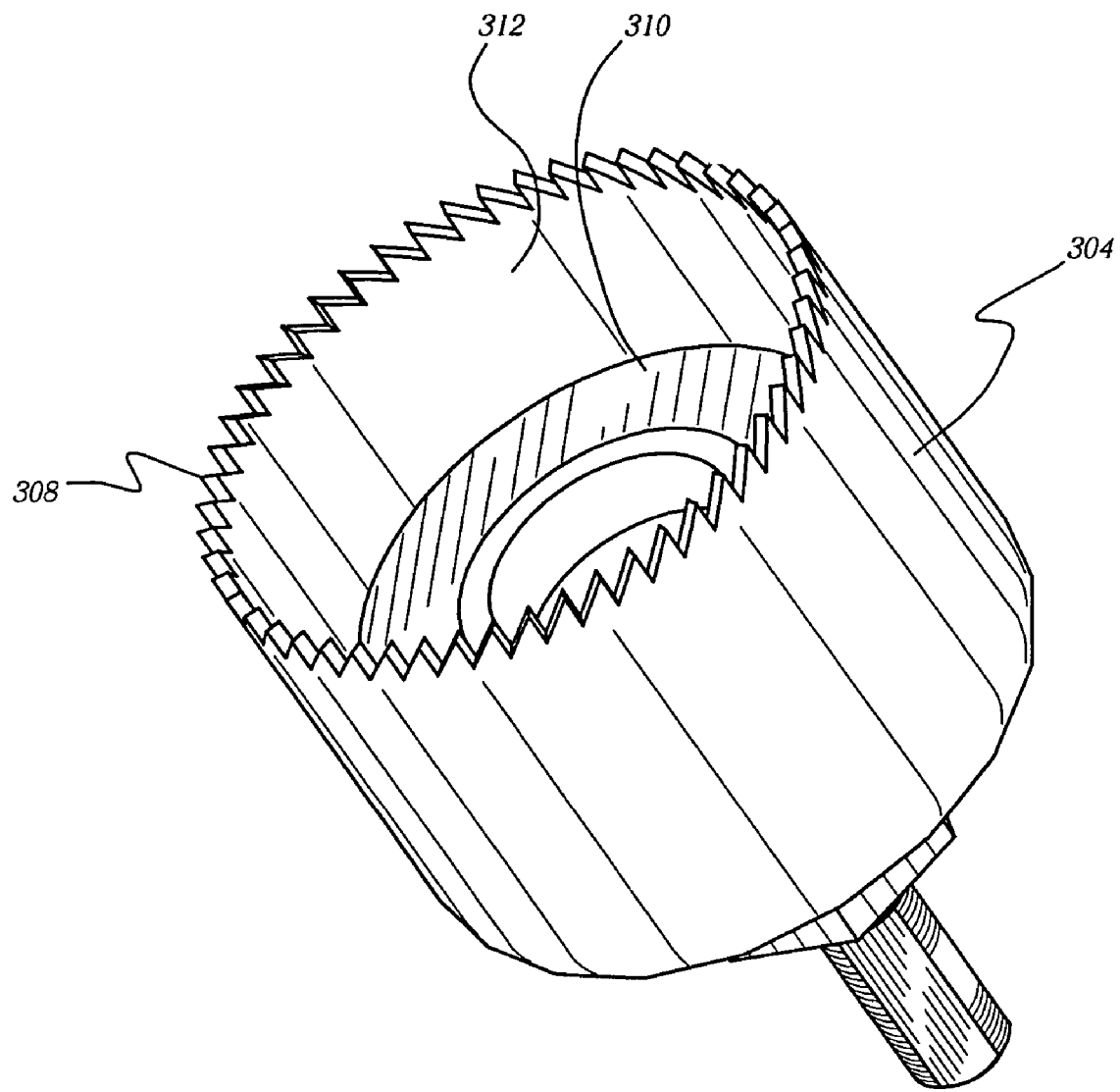
FIG. 20 is a perspective view of a plug cutter having a relatively large longitudinal axis to facilitate the production of larger plugs.

Referring now to FIG. 20, a perspective view of a plug cutter 304 is depicted in accordance with one embodiment of the present invention. The plug cutter 304 (now part of the invention) includes a slightly tapered configuration (i.e., wide at its proximal end that its distal, cutting edge) and relatively longer axial dimension than the plug cutter 208 above. The tapered configuration provides a cutting edge 308 that is relatively smaller in diameter than the proximate bottom wall 310 of the housing of saw 304. The longer axial dimension results in more of the severed portion 266 being contained inside the plug cutter 304 after the spring 216 of the device 210 has expanded to a non-biased position. A larger portion of the severed portion 266 being contained inside the saw 304, provides means to facilitate retention of the severed workpiece portion 266 as the plug cutter 304 is removed from the workpiece, thereby preventing the severed portion 266 from falling out of the plug cuter. The tapered configuration promotes the quick manual removal of the plug 266 from the plug cutter 304 by decreasing the surface area of engagement between a conically configured inner wall of the plug cutter 304 and the cylindrically configured outer wall of the plug 266.

One embodiment comprises forming a plug 266 using a plug cutter 208, 304. In this embodiment, a preselected portion of a workpiece is first engaged using at least a portion of a fastening member 212 removably secured to the plug cutter 208, 304. The preselected portion of the workpiece is then engaged using a cutting portion of the plug cutter 208 and spring 216 having a first end joined to at least a portion of the fastening member 212 is compressed. Alternatively, a preselected portion of a workpiece is engaged by a cutting portion of the plug cutter 208 and then a portion of fastening member 212 or at substantially the same time. The preselected portion of the workpiece is severed and the severed, preselected portion of the workpiece is removed from the bore of the plug cutter 208 using at least spring 216, forming plug 266.

In still another embodiment, the cutting portion of the plug expulsion device engages and disengages the workpiece simultaneously.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The embodiment of the invention in which an exclusive property or privilege is claimed is defined as follows:

1. A workpiece removal device for a plug cutter, the combination comprising:
    a) a housing having a longitudinally extending surface, a first closed end and a second open end opposite said first closed end;
    b) a boss coupled to said first closed end and extending toward said second open end;
    c) a biasing member attached to a distal end of said boss;
    d) a bearing assembly having a first raceway, a second raceway and ball bearings attached to said biasing member; and,
    wherein a preselected portion of a workpiece is ultimately severed from said workpiece, and wherein, said biasing member ejects said preselected portion from said plug cutter, forming a plug.

2. The device of claim 1 wherein said boss is removably coupled to said first closed end.

3. The device of claim 1 wherein said boss comprises a locking member located proximate said distal end, said locking member having a threaded end portion and a shank portion with opposing first and second ends, said threaded end portion integrally joined to said first end of said shank portion and said second end of said shank portion configured for insertion through an aperture defined in said first closed end of the plug cutter and removably received in a rotary motion tool.

4. The device of claim 3 further comprising a locking nut configured to slide over said shank portion and threadably engage said threaded end portion, whereby the position of said boss removably couples said boss to said plug cutter.

5. The device of claim 4 wherein said locking nut threadably engages said threaded end portion of said locking member such that an inner end of said locking nut forcibly engages an outer planar wall of said first closed end, thereby rigidly removably coupling said boss fastening member to said first closed end.

6. The device of claim 1 wherein said biasing member comprises at least a spring.

7. The device of claim 6 wherein said biasing member further comprises a securing member, said securing member coupled to both a first end of said spring and said distal end of said boss.

8. The device of claim 7 wherein said securing member comprises a flat disk.

9. The device of claim 7 wherein said securing member comprises a washer.

10. A workpiece removal device for a plug cutter, the combination comprising:
    a) a housing having a longitudinally extending surface, a first closed end and a second open end opposite said first closed end;
    b) a boss removably coupled to said first closed end and extending toward said second open end, said boss comprising a locking member configured to be removably received in a rotary motion tool;
    c) a biasing member coupled to said boss;
    d) a bearing assembly having a first raceway, a second raceway, and ball bearings attached to said biasing member; and
    wherein a portion of the bearing assembly contacts a workpiece and a preselected portion of said workpiece is ultimately severed from said workpiece, and wherein said biasing member ejects said preselected portion from said plug cutter, forming a plug.

11. The device of claim 10 wherein said locking member has a threaded end portion and a shank portion with opposing first and second ends, said threaded end portion integrally joined to said first end of said shank portion and said second end of said shank portion configured for insertion through an aperture defined in said first closed end of the plug cutter and removably received in said rotary motion tool.

12. The device of claim 11 further comprising a locking nut configured to slide over said shank portion and threadably engage said threaded end portion, whereby an inner end of said locking nut forcibly engages an outer planar wall of said first closed end, thereby rigidly removably coupling said boss to said first closed end.

13. The device of claim 10 wherein said biasing member comprises at least a spring.

14. The device of claim 10 wherein said biasing member comprises a securing member coupled to at least said biasing member and a distal end of said boss.

15. A method of forming a plug using a plug cutter, said method comprising the steps of:
    engaging a preselected portion of a workpiece using at least a portion of a bearing assembly having a first raceway, a second raceway and ball bearings proximate an open end of the plug cutter;
    engaging said preselected portion of said workpiece using a cutting portion of the plug cutter located proximate said open end;

compressing a biasing member having one end joined to said bearing assembly and another end joined to a boss coupled to a closed end of the plug cutter;
severing said preselected portion of said workpiece;
disengaging said workpiece; and
ejecting said severed, preselected portion of said workpiece using said biasing member substantially simultaneously with said disengagement, thereby; forming the plug.

16. The device of claim 1 wherein the first and second raceways of the bearing assembly each include a channel.

17. The device of claim 16 wherein the ball bearings are located within the channels of the first and second raceways.

18. The device of claim 1 wherein the first and second raceways of the bearing assembly are held together by a securing member.

19. The device of claim 10 wherein the first and second raceways of the bearing assembly each include a channel.

20. The device of claim 19 wherein the ball bearings are located within the channels of the first and second raceways.

21. The device of claim 10 wherein the first and second raceways of the bearing assembly are held together by a securing member.

* * * * *